(12) United States Patent
Okuyama

(10) Patent No.: US 12,212,563 B2
(45) Date of Patent: Jan. 28, 2025

(54) AUTHENTICATION SYSTEM, TERMINAL, CONTROL METHOD FOR TERMINAL, AND STORAGE MEDIUM

(71) Applicant: NEC Corporation, Tokyo (JP)

(72) Inventor: Yoshiaki Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 17/918,164

(22) PCT Filed: Apr. 24, 2020

(86) PCT No.: PCT/JP2020/017661
§ 371 (c)(1),
(2) Date: Oct. 11, 2022

(87) PCT Pub. No.: WO2021/214969
PCT Pub. Date: Oct. 28, 2021

(65) Prior Publication Data
US 2023/0127896 A1    Apr. 27, 2023

(51) Int. Cl.
*H04L 9/40* (2022.01)
(52) U.S. Cl.
CPC .................. *H04L 63/0861* (2013.01)
(58) Field of Classification Search
CPC .................................................. H04L 63/0861
(Continued)

(56) References Cited

U.S. PATENT DOCUMENTS 8,793,509 B1 * 7/2014 Nelson .................. H04L 63/105
713/193
11,017,688 B1 * 5/2021 Arazi ................. G06Q 30/0249
(Continued)

FOREIGN PATENT DOCUMENTS

JP    2003-316908 A    11/2003
JP    2004-038270 A    2/2004
(Continued)

OTHER PUBLICATIONS

International Search Report for PCT Application No. PCT/JP2020/017661, mailed on Jul. 7, 2020.
(Continued)

*Primary Examiner* — Thanh T Le
(74) *Attorney, Agent, or Firm* — Sughrue Mion, PLLC

(57) ABSTRACT

An authentication system includes an authentication server, a management server, and a terminal that the user possesses. The authentication server stores first biometric information of the user and performs biometric authentication of the user using the first biometric information. The management server stores the personal information of the user. When the biometric authentication of the user is successful, the authentication server transmits, to the terminal, a notification of authentication that indicates the biometric authentication of the user was successful. In response to the notification of authentication received, the terminal acquires the intent of the user regarding whether or not to accept the provision of stored personal information to a third person. When the user accepts the provision of stored personal information to the third person, the terminal transmits a notification of acceptance to the management server.

12 Claims, 25 Drawing Sheets

(58) Field of Classification Search
USPC .......................................................... 726/3
See application file for complete search history.

(56) References Cited

U.S. PATENT DOCUMENTS

| | | | | |
|---|---|---|---|---|
| 11,651,095 | B2* | 5/2023 | Gupta | H04L 63/0853 |
| | | | | 726/6 |
| 11,755,707 | B1* | 9/2023 | Andra | G06F 21/32 |
| | | | | 726/28 |
| 2010/0185871 | A1* | 7/2010 | Scherrer | G06F 21/6218 |
| | | | | 726/4 |
| 2010/0325691 | A1* | 12/2010 | Willars | H04L 67/564 |
| | | | | 709/219 |
| 2012/0166810 | A1* | 6/2012 | Tao | G06F 21/32 |
| | | | | 713/186 |
| 2014/0317715 | A1* | 10/2014 | Conner | G06K 19/07354 |
| | | | | 726/7 |
| 2014/0325592 | A1* | 10/2014 | Unagami | G06Q 30/02 |
| | | | | 726/1 |
| 2014/0359713 | A1* | 12/2014 | Ren | H04L 67/53 |
| | | | | 726/4 |
| 2016/0098577 | A1* | 4/2016 | Lacey | G06F 21/6245 |
| | | | | 726/28 |
| 2017/0324762 | A1* | 11/2017 | Chow | H04L 69/22 |
| 2020/0193052 | A1* | 6/2020 | Dubois | H04L 63/105 |
| 2023/0281283 | A1* | 9/2023 | Modani | H04W 4/33 |
| | | | | 726/19 |

FOREIGN PATENT DOCUMENTS

| | | |
|---|---|---|
| JP | 2004-078302 A | 3/2004 |
| JP | 2006-190112 A | 7/2006 |
| JP | 2020-024511 A | 2/2020 |
| WO | 2014/115537 A1 | 7/2014 |
| WO | 2017/170384 A1 | 10/2017 |

OTHER PUBLICATIONS

English translation of Written opinion for PCT Application No. PCT/JP2020/017661, mailed on Jul. 7, 2020.
Japanese Office Action for JP Application No. 2024-009143 mailed on Nov. 12, 2024 with English Translation.

* cited by examiner

Fig.10

AUTHENTICATION INFORMATION DATABASE

| USER ID (uID) | PASSWORD (PW) | FEATURE AMOUNT | CONTACT ADDRESS | SERVICE PROVIDER (spID) | SERVICE USER ID (suID) |
|---|---|---|---|---|---|
| ... | ... | ... | ... | ... | ... |
| U1 | PW1 | FV1 | ADD1 | — | — |

Fig.11

AUTHENTICATION INFORMATION DATABASE

| USER ID (uID) | PASSWORD (PW) | FEATURE AMOUNT | CONTACT ADDRESS | SERVICE PROVIDER (spID) | SERVICE USER ID (suID) |
|---|---|---|---|---|---|
| ... | ... | ... | ... | ... | ... |
| U1 | PW1 | FV1 | ADD1 | S1 | U1S1 |

Fig.12

AUTHENTICATION INFORMATION DATABASE

| USER ID (uID) | PASSWORD (PW) | FEATURE AMOUNT | CONTACT ADDRESS | SERVICE PROVIDER (spID) | SERVICE USER ID (suID) |
|---|---|---|---|---|---|
| ... | ... | ... | ... | ... | ... |
| U1 | PW1 | FV1 | ADD1 | S1 | U1S1 |
| | | | | S2 | U1S2 |
| U2 | PW2 | FV2 | ADD2 | S1 | U2S1 |

SERVICE REGISTRATION

PLEASE, INPUT FOLLOWING INFORMATION.

NAME [　　　　　　　　　　]

ADDRESS [　　　　　　　　　]

⋮

CUSTOMERS WHO WISH TO PROVIDE
SERVICE USING FACE RECOGNITION SHOULD
INPUT ID, PASSWORD REGISTERED IN
AUTHENTICATION CENTER.

ID [　　　　　　　　　　]

PASSWORD [　　　　　　　　]

[ DETERMINE ]

Fig.15

USER INFORMATION DATABASE

| PERSONAL INFORMATION | SERVICE USER ID (suID) |
|---|---|
| ⋮ | ⋮ |
| Name, Address, ··· | U1S1 |

AUTHENTICATION SYSTEM, TERMINAL, CONTROL METHOD FOR TERMINAL, AND STORAGE MEDIUM

This application is a National Stage Entry of PCT/JP2020/017661 filed on Apr. 24, 2020, the contents of all of which are incorporated herein by reference, in their entirety.

TECHNICAL FIELD

The present invention relates to an authentication system, a terminal, a control method for a terminal, and a storage medium.

BACKGROUND ART

In recent years, various services using biometric information have started to spread. For example, face authentication is used for various procedures (check in, baggage check, etc.) performed in an airport, check in to a hotel, and the like.

For example, PTL 1 describes providing an electronic payment system that enhances security and enables quick payment processing. In the electronic payment system disclosed in PTL 1, biometric information of a user is used for payment.

In the service using the face authentication, processing is performed in the following flow. First, a terminal (a terminal installed in an airport or a hotel) acquires a face image of a customer, and generates a feature amount (feature vector) characterizing the face image. The generated feature amount is transmitted to a server on the network.

The server includes a database that stores biometric information and personal information (name, address, etc.) of a user who receives a service by face authentication. When acquiring the collation request from the terminal, the server retrieves (collates) the database, and specifies the biometric information and the personal information relevant to the collation request from the terminal. The server transmits the specified personal information to the terminal, and a terminal installed at an airport or the like performs a task based on the acquired personal information.

Citation List

Patent Literature

[PTL 1] JP 2006-190112 A

SUMMARY OF INVENTION

Technical Problem

As described above, when a service is provided using biometric authentication, personal information of the user is required. Here, by collecting and accumulating a large number of pieces of personal information, the personal information generates a large value. Specifically, data indicating what type of service is being provided to users in what age group is a major deciding factor in marketing of a company.

However, from the viewpoint of protecting the privacy of the user, it is difficult to provide the personal information used at the time of providing the service by the biometric authentication to a third party without the consent of the user.

A main object of the present invention is to provide an authentication system, a terminal, a control method of the terminal, and a storage medium that contribute to user's control and management of personal information related to service provision by biometric authentication.

Solution to Problem

According to a first aspect of the present invention, there is provided an authentication system including: an authentication server that stores first biometric information of a user and performs biometric authentication of the user using the first biometric information; a management server that stores personal information of the user; and a terminal that is possessed by the user. When the authentication server succeeds in the biometric authentication of the user, the authentication server transmits, to the terminal, a notification of authentication indicating that the biometric authentication of the user is successful. The terminal acquires an intention of the user as to whether to accept provision of the stored personal information to a third party in response to reception of the notification of authentication. A notification of acceptance is transmitted to the management server when the user accepts to provide the stored personal information to the third party.

According to a second aspect of the present invention, there is provided an authentication system including: an authentication server that stores first biometric information of a user and performs biometric authentication of the user using the first biometric information; a management server that stores personal information of the user; and a terminal that is possessed by the user. When the authentication server succeeds in the biometric authentication of the user, the management server transmits, to the terminal, a notification of authentication indicating that the biometric authentication of the user is successful. The terminal acquires an intention of the user as to whether to accept provision of the stored personal information to a third party in response to reception of the notification of authentication. A notification of acceptance is transmitted to the management server when the user accepts to provide the stored personal information to the third party.

According to a third aspect of the present invention, there is provided a terminal that performs: receiving, from an authentication server that stores first biometric information of a user and performs biometric authentication of the user by using the first biometric information, a notification of authentication indicating that the biometric authentication of the user is successful; in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

According to a fourth aspect of the present invention, there is provided a control method of a terminal, including: by the terminal, receiving, from an authentication server that stores first biometric information of a user and performs biometric authentication of the user by using the first biometric information, a notification of authentication indicating that the biometric authentication of the user is successful; in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

According to a fifth aspect of the present invention, there is provided a computer-readable storage medium storing a program for causing a computer mounted in a terminal to execute: receiving, from an authentication server that stores first biometric information of a user and performs biometric authentication of the user by using the first biometric information, a notification of authentication indicating that the biometric authentication of the user is successful; in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

Advantageous Effects of Invention

According to aspects of the present invention, there are provided an authentication system, a terminal, a control method of the terminal, and a storage medium that contribute to user's control and management of personal information related to service provision by biometric authentication. The effect of the present invention is not limited to the above. According to the present invention, other effects may be exhibited instead of or in addition to the effects.

BRIEF DESCRIPTION OF DRAWINGS

FIG. 10 is a diagram illustrating an example of an authentication information database.

FIG. 11 is a diagram illustrating an example of the authentication information database.

FIG. 12 is a diagram illustrating an example of the authentication information database.

FIG. 14 is a diagram for explaining an operation of a personal information acquisition unit of the management server according to the first example embodiment.

FIG. 15 is a diagram illustrating an example of a user information database.

EXAMPLE EMBODIMENT

Figure 1:
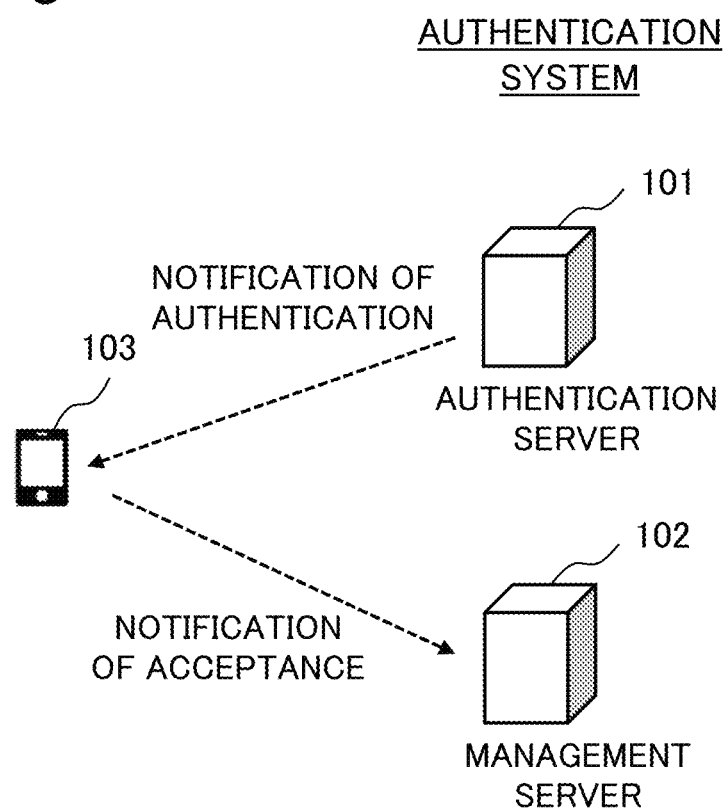
FIG. 1 is a diagram for explaining an outline of an example embodiment.

First, an outline of an example embodiment will be described. The reference numerals in the drawings attached to this outline are attached to each element for convenience as an example for assisting understanding, and the description of this outline is not intended to be any limitation. In a case where there is no particular explanation, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

The authentication system according to an example embodiment includes an authentication server 101, a management server 102, and a terminal 103 possessed by a user (see FIG. 1). The authentication server 101 stores first biometric information of the user and performs biometric authentication of the user using the first biometric information. The management server 102 stores the personal information of the user. When the biometric authentication of the user is successful, the authentication server 101 transmits, to the terminal 103, a notification of authentication indicating that the biometric authentication of the user has been successful. In response to the notification of authentication received, the terminal 103 acquires the intention of the user regarding whether to accept the provision of the stored personal information to a third party. When the user accepts to provide the stored personal information to the third party, the terminal 103 transmits a notification of acceptance to the management server 102.

In the authentication system, the terminal 103 is notified of the fact that an authentication process using the biometric information registered in the authentication server 101 has been performed. The user recognizes that the biometric authentication using the biometric information has been performed by the notification of authentication notified to the terminal 103. Thereafter, the terminal 103 acquires an intention whether the user accepts provision of the personal information regarding the biometric authentication to a third party (for example, the information server 40 to be described later). In a case where the user agrees to provide the personal information, the terminal 103 transmits the notification of acceptance that indicates the agreement to the management server 102. In this manner, in the authentication system including the terminal 103, the user himself/herself can control and manage the personal information related to the service provision by the biometric authentication.

Hereinafter, specific example embodiments will be described in more detail with reference to the drawings.

First Example Embodiment

Figure 2:
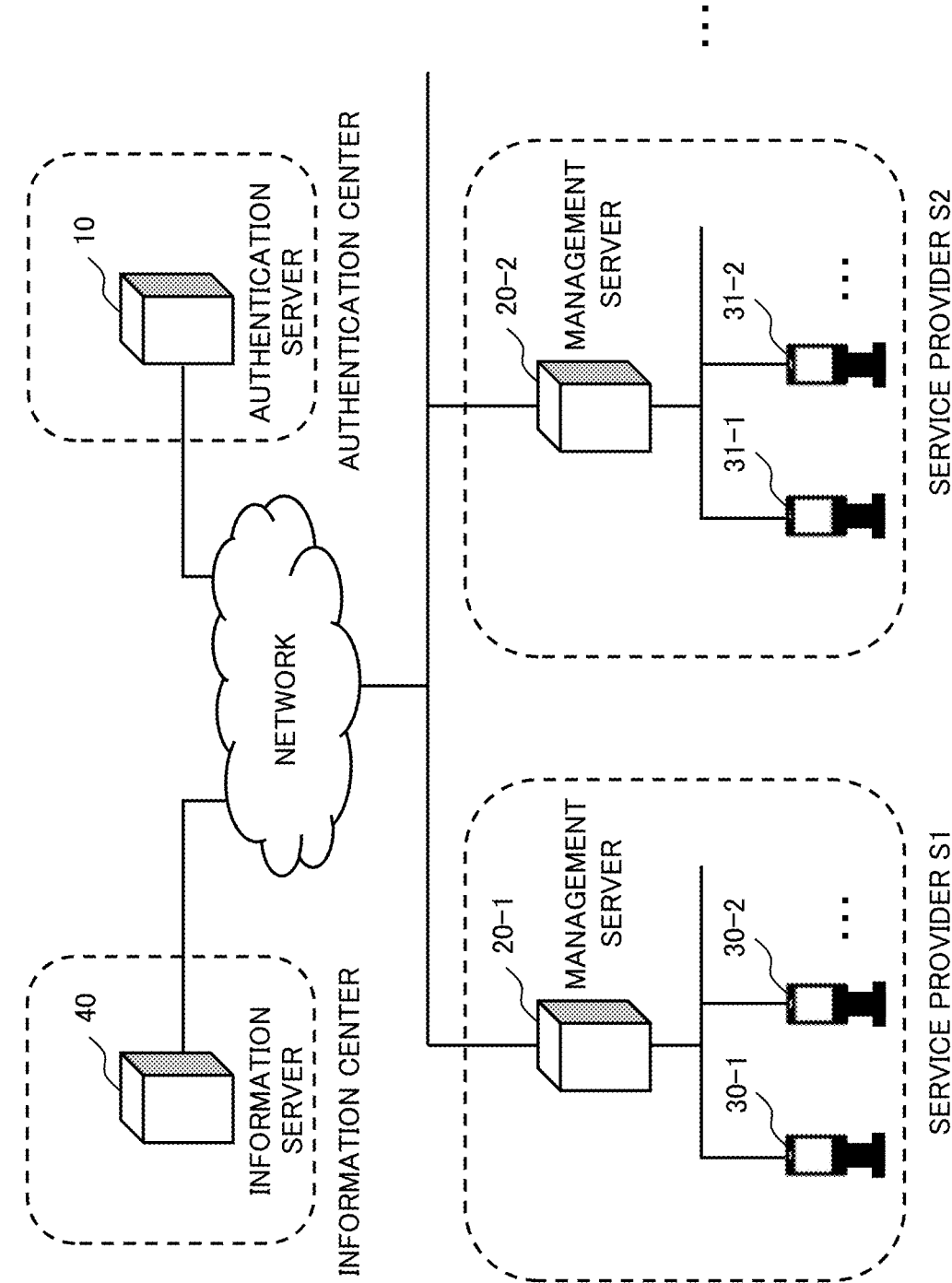
FIG. 2 is a diagram illustrating an example of a schematic configuration of an authentication system according to a first example embodiment.

A first example embodiment will be described in more detail with reference to the drawings.
[Configuration of System]
FIG. 2 is a diagram illustrating an example of a schematic configuration of an authentication system according to the first example embodiment. As illustrated in FIG. 2, the authentication system includes an authentication center, an information center, and a plurality of service providers.

Each service provider participating in the authentication system provides a service using biometric authentication. Examples of the service provided by the service provider include a payment service at a retail store or the like and an accommodation service at a hotel or the like. Alternatively, the service provided by the service provider may be an entrance examination or the like at an airport or a port. The service provider of the disclosure of the present application only needs to be able to provide any service that can be provided using biometric authentication.

An authentication server 10 is installed in the authentication center. The authentication server 10 stores biometric information (first biometric information) of the user, and performs biometric authentication of the user using the biometric information. The authentication server 10 operates as a certificate authority for authentication using biometric information. The authentication server 10 may be a server installed on the site of the authentication center or a server installed on a cloud.

The biometric information of the user includes, for example, data (feature amount) calculated from physical characteristics unique to an individual, such as a face, a fingerprint, a voiceprint, and a pattern of a vein, a retina, and an iris of a pupil. Alternatively, the biometric information of the user may be image data such as a face image and a fingerprint image. The biometric information of the user may include the physical characteristics of the user as information. In the disclosure of the present application, a case of using biometric information regarding a "face" of a person will be described.

The authentication server 10 is a server device for achieving a service by biometric authentication. The authentication server 10 processes an "authentication request" transmitted from each service provider and transmits a result of the authentication process to the service provider.

Each service provider has a management server and an authentication terminal.

For example, a management server 20 and a plurality of authentication terminals 30 are installed in a service provider S1. In a service provider S2, a management server 20 and a plurality of authentication terminals 31 are installed.

In the following description, when it is necessary to distinguish each component, a reference sign on the right side with a hyphen is used. Since the operations and the like of the devices included in the service provider S1 and the service provider S2 can be the same, the following description will focus on the service provider S1.

The devices illustrated in FIG. 2 are connected to each other. For example, the authentication server 10 and the management server 20 are connected by wired or wireless communication means, and are configured to be able to communicate with each other.

The management server 20 is a server that controls and manages the overall operations of the service provider. For example, in a case where the service provider is a retail store, the management server 20 performs product inventory management and the like. Alternatively, if the service provider is a hotel business operator, the management server 20 manages reservation information of guests and the like.

The management server 20 includes a control function and a management function related to biometric authentication of the user in addition to the function related to the service provision. The management server 20 stores personal information (for example, name and the like) of the user who uses the authentication system.

The authentication terminal 30 is a device that is connected to the management server 20 and serves as an interface of the user (customer) who has visited the service provider. The user receives various services via the authentication terminal 30. For example, in a case where the service provider is a retail store, the user makes payment using the authentication terminal 30. Alternatively, if the service provider is a hotel business operator, the user performs a check-in procedure using the authentication terminal 30.

The information server 40 is installed in the information center. The information center and the information server 40 correspond to a "third party" as viewed from the user. The information server 40 collects personal information of a user who has received a service from a service provider. For example, the information server 40 collects the type, name, age, gender, and the like of the service used by the user. The collected personal information is transferred to another business operator. Other business operators use the acquired personal information for marketing and the like.

FIG. 2 is an example and is not intended to limit the configuration and the like of the authentication system of the disclosure of the present application. For example, the authentication center may include two or more authentication servers 10. Alternatively, the service provider may include at least one or more authentication terminals 30. Alternatively, the functions of the management server 20 and the authentication terminal 30 may be integrated, and a service using biometric authentication may be provided by one integrated device. Alternatively, in each service provider, a plurality of authentication terminals 30 may be connected to one management server 20 as illustrated in FIG. 2, or one authentication terminal 30 may be connected to one management server 20. Alternatively, the functions of the authentication server 10 and the information server 40 may be integrated. That is, the authentication server 10 can also correspond to a "third party" as viewed from the user.

[Outline of System Operation]

Next, a schematic operation of the authentication system according to the first example embodiment will be described.

Operation of the authentication system includes four phases.

A first phase is a phase (user registration phase) in which system registration of the user is performed.

A second phase is a phase (service registration phase) in which service registration is performed.

A third phase is a phase (service providing phase) in which a service using biometric authentication is provided to the user.

A fourth phase is a phase (personal information collection phase) of collecting the personal information of the user who has received the provision of the service.

[User Registration Phase]

Figure 3:
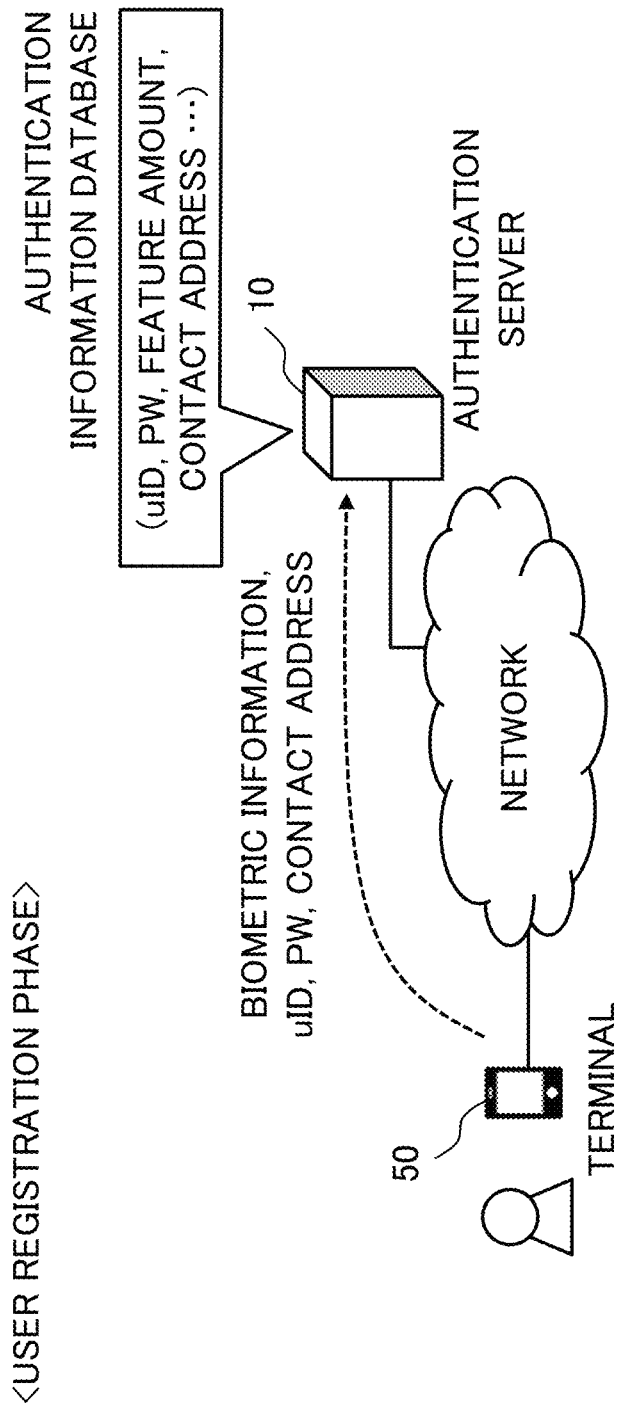
FIG. 3 is a diagram for explaining an operation in a user registration phase of the authentication system according to the first example embodiment.

FIG. 3 is a diagram for explaining an operation in the user registration phase of the authentication system according to the first example embodiment.

A user who wishes to provide a service using biometric authentication performs user registration in advance. The user determines information (user ID (Identifier), password (PW) for identifying the user himself/herself in the authentication system, and registers the information in the system. In the drawings including FIG. 3, the user ID is denoted as "uID".

The user registers his/her own biometric information (for example, a face image) and contact address (for example, an e-mail address of an account receivable by the terminal 50) in the system.

The user registers the four pieces of information (user ID, password, biometric information, contact address) in the system using any means. For example, the user may mail a document describing the four pieces of information to the authentication center, and an employee of the authentication center may input the four pieces of information to the authentication server 10. Alternatively, the user may mail an external storage device such as a universal serial bus (USB) storing the four pieces of information to the authentication center.

Alternatively, the user may input his/her own face image captured by operating the possessed terminal 50, the user ID, the password, and the contact address to the authentication server 10. Examples of the terminal 50 include a mobile terminal device such as a smartphone, a mobile phone, a game machine, and a tablet, a computer (personal computer, notebook computer), and the like.

The authentication server 10 generates a feature amount (a feature vector including a plurality of feature amounts) from the acquired face image, and stores the feature amount, the user ID, the password, and the contact address in association with each other. Specifically, the authentication server 10 adds a new entry to the authentication information database, and stores the four pieces of information in association with each other.

In this manner, in the user registration phase, a first ID (for example, the user ID) that uniquely determines the user in the system and the first biometric information used for authentication of the user are registered in the system. In the first example embodiment, an example will be described in which a user ID and a password are used as an identifier (first ID) that uniquely determines a system user. However, if there is no overlap in user IDs between users, a user ID can be used as the identifier (first ID).

[Service Registration Phase]

Figure 4:
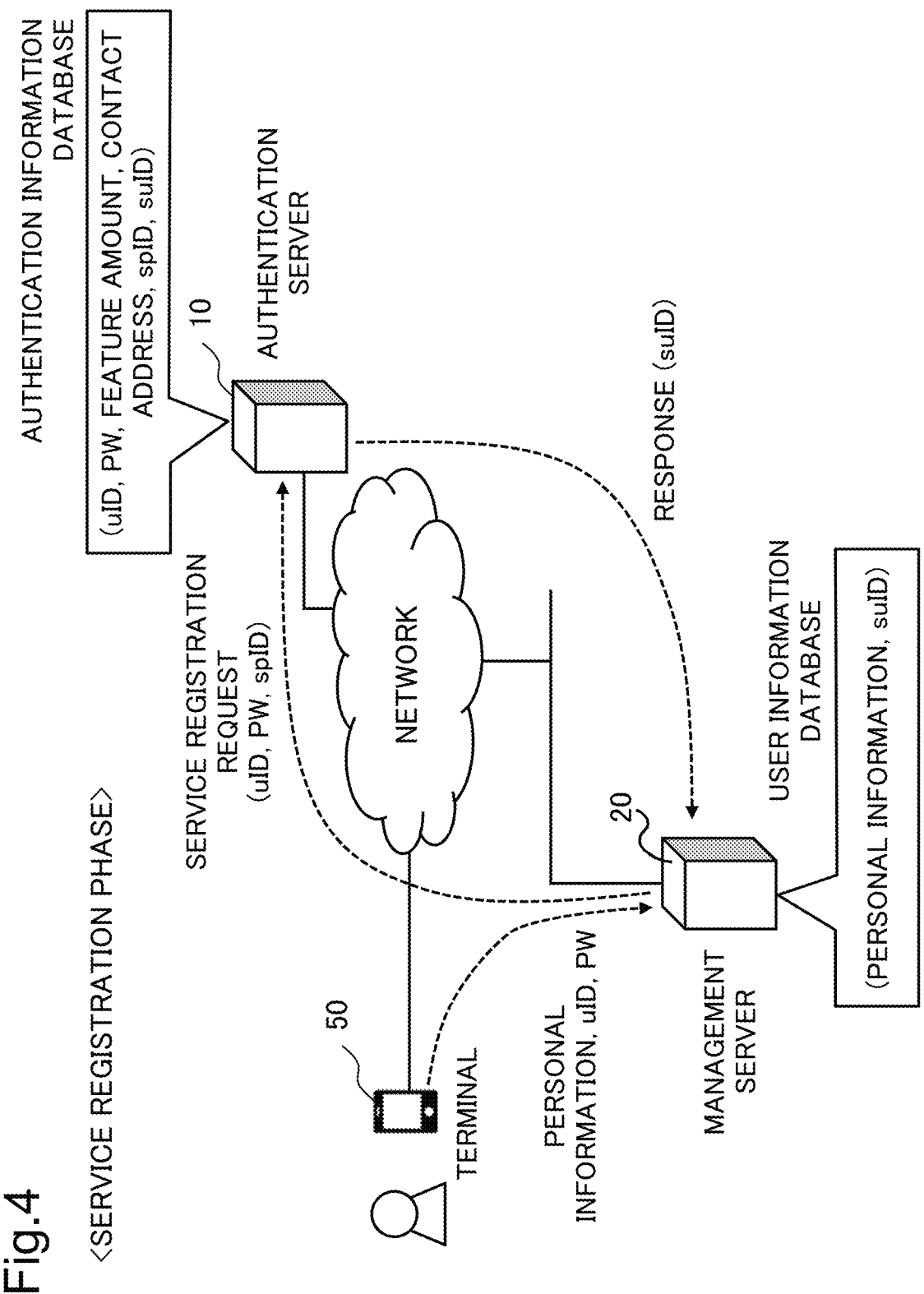
FIG. 4 is a diagram for explaining an operation in a service registration phase of the authentication system according to the first example embodiment.

FIG. 4 is a diagram for explaining an operation in a service registration phase of the authentication system according to the first example embodiment.

The user who has completed the user registration selects a service provider who wants to receive a service by biometric authentication, and registers the selected service provider in the system. For example, in FIG. 2, in a case where the user desires to provide a service from the service provider S1, the service provider S1 is registered in the system.

The user registers personal information (for example, name and the like) necessary for receiving a service from the selected service provider in the system. Examples of the personal information include name, age, gender, and the like. The user registers the user ID and the password determined in the user registration phase in the system together with the personal information.

In the disclosure of the present application, the personal information is defined as information that does not include biometric information of the user (person to be authenticated). That is, the biometric information and the feature amount generated from the biometric information are excluded from the "personal information" of the disclosure of the present application.

The user inputs the three pieces of information (personal information, user ID, password) to the service provider using any means. For example, the user sends a medium (paper medium, electronic medium) describing the above three pieces of information to the selected service provider by mail. An employee of the service provider inputs the above three pieces of information to the management server 20. The user may input the three pieces of information to the management server 20 by operating the authentication terminal 30 installed in the service provider.

Alternatively, as illustrated in FIG. 4, the user may operate the terminal 50 to input the above three pieces of information to the management server 20. In this case, the user inputs the three pieces of information on a web page managed and operated by the service provider.

Upon acquiring the three pieces of information (personal information, user ID, password), the management server 20 transmits a "service registration request" to the authentication server 10. Specifically, the management server 20 transmits a service registration request including the service provider ID, the user ID, and the password to the authentication server 10.

The service provider ID is identification information for uniquely identifying a service provider (a retail store or the like participating in an authentication base using biometric authentication) included in the authentication system. In the example of FIG. 2, different service provider IDs are assigned to the service providers S1 and S2, respectively.

The service provider ID is an ID assigned to each service provider, and is not an ID assigned to each service. For example, in FIG. 2, even if the service providers S1 and S2 are business operators that provide the same type of service (for example, accommodation service), if the management entities are different, different IDs are assigned to these service providers.

The authentication server 10 and the management server 20 share the service provider ID by any method. For example, when the service provider participates in the authentication base, the authentication server 10 may generate a service provider ID and distribute (notify) the generated service provider ID to the service provider. In the drawings including FIG. 4, the service provider ID is denoted as "spID".

When receiving the service registration request, the authentication server 10 retrieves an authentication information database using the user ID and the password included in the request as keys, and specifies the relevant user. Thereafter, the authentication server 10 generates a "service user ID".

The service user ID is identification information that uniquely defines a correspondence relationship (combination) between the user and the service provider. For example, in the example of FIG. 2, different values are set to the service user ID determined from the combination of a user U1 and the service provider S1 and the service user ID determined from the combination of the user U1 and the service provider S2.

The authentication server 10 stores the user ID, the password, the feature amount, the contact address, the service provider ID, and the generated service user ID in association with each other. In the drawings including FIG. 4, the service user ID is denoted as "suID".

The authentication server 10 transmits the generated service user ID to the transmission source of the service registration request. The authentication server 10 transmits a response including the service user ID to the management server 20 and dispenses the service user ID.

The management server 20 stores the service user ID acquired from the authentication server 10 and the personal information of the user in association with each other. The management server 20 adds a new entry to the user information database and stores the information (personal information, service user ID).

The user repeats the registration operation as described above for each service provider who wants to receive the provision of the service using the biometric authentication. In other words, the user does not need to register the use of the service provider who does not need to provide the service.

In this manner, in the service registration phase, the service registration request including the first ID (for example, the user ID) and a second ID (for example, the service provider ID) is transmitted from the service provider of the service that the user desires to use to the authentication server 10. When the service registration request is processed, the authentication server 10 generates a third ID (for example, the service user ID) uniquely determined by a combination of the user and the service provider. The authentication server 10 transmits the third ID to the service provider. The service provider (management server 20) stores the personal information of the user and the third ID in association with each other.

[Service Providing Phase]

Figure 5:
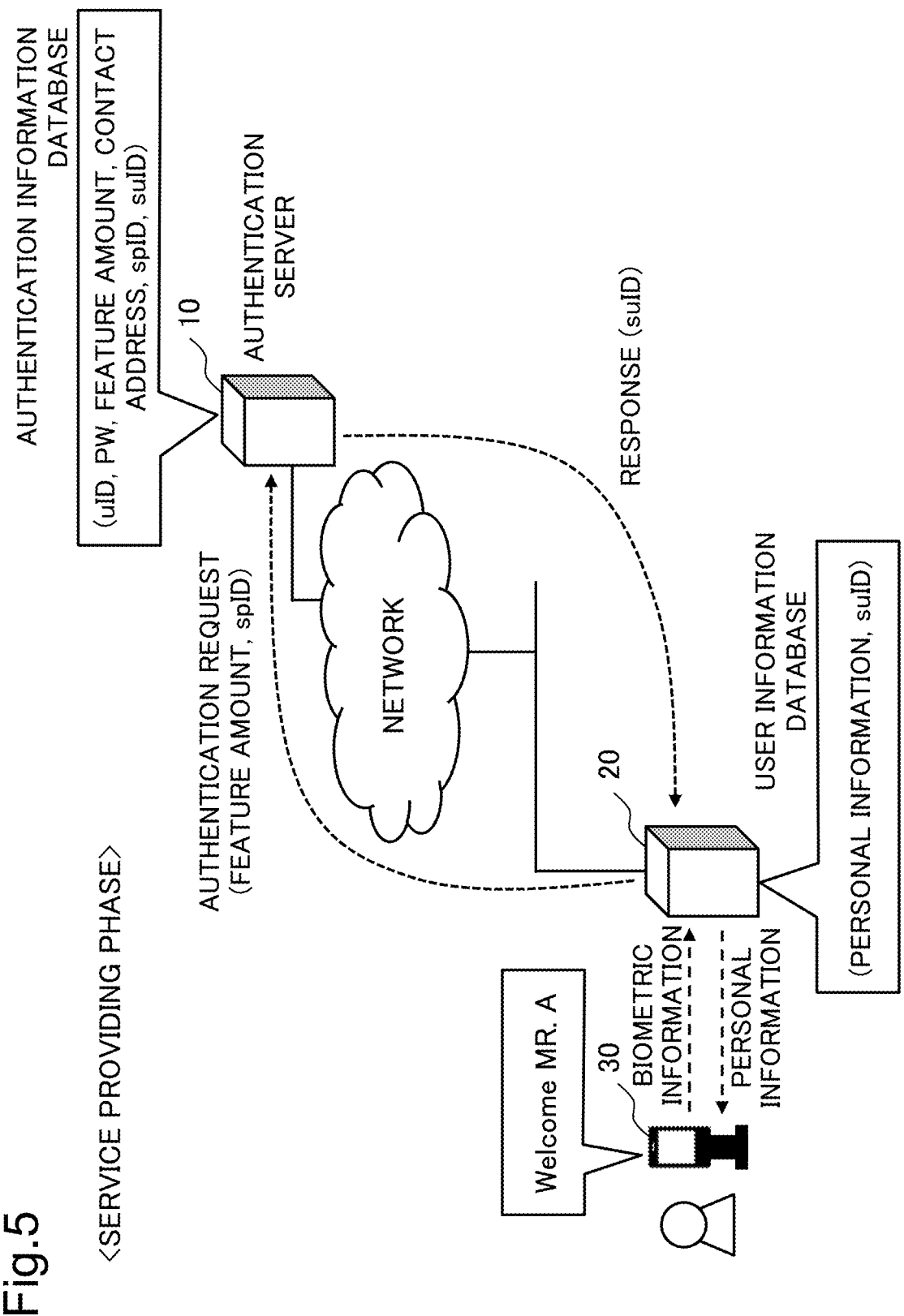
FIG. 5 is a diagram for explaining an operation in a service providing phase of the authentication system according to the first example embodiment.

FIG. 5 is a diagram for explaining an operation in a service providing phase of the authentication system according to the first example embodiment.

The user who has completed the service registration (service registration phase) visits the service provider. The user moves to the front of the authentication terminal 30.

The authentication terminal 30 acquires the biometric information from the user in front thereof. Specifically, the authentication terminal 30 images the user and acquires a face image. The authentication terminal 30 transmits the acquired face image to the management server 20.

The management server 20 generates a feature amount from the acquired face image. The management server 20 transmits an authentication request including the generated feature amount and the service provider ID to the authentication server 10.

The authentication server 10 extracts a feature amount from the authentication request, and executes collation processing (One-to-N matching; N is a positive integer, and the same applies hereinafter) using the extracted feature amount and the feature amount registered in the authentication information database.

The authentication server 10 specifies the user by the collation processing, and specifies the service user ID relevant to the service provider ID included in the authentication request among the plurality of service user IDs associated with the specified user.

The authentication server 10 transmits the specified service user ID to the transmission source of the authentication request. The authentication server 10 transmits a response (response to the authentication request) including the specified service user ID to the management server 20.

The management server 20 retrieves the user information database using the acquired service user ID as a key, and specifies personal information relevant to the service user ID. The management server 20 transmits the specified personal information to the authentication terminal 30. The authentication terminal 30 provides a service using the acquired personal information.

In this manner, in the service providing phase, the authentication terminal 30 acquires second biometric information of the user and transmits the acquired second biometric information to the management server. The authentication server 10 receives an authentication request including the biometric information of the user and the second ID (service provider ID) from the service provider. The authentication server 10 specifies the third ID (service user ID) by collation processing using the first and second biometric information and the second ID. The authentication server 10 transmits the specified third ID to the service provider. When the service is provided to the user, the management server 20 specifies the personal information of the user using the third ID acquired by transmitting the authentication request to the authentication server 10. The service provider provides the service to the user using the specified personal information.

[Personal Information Collection Phase]

Figure 6:
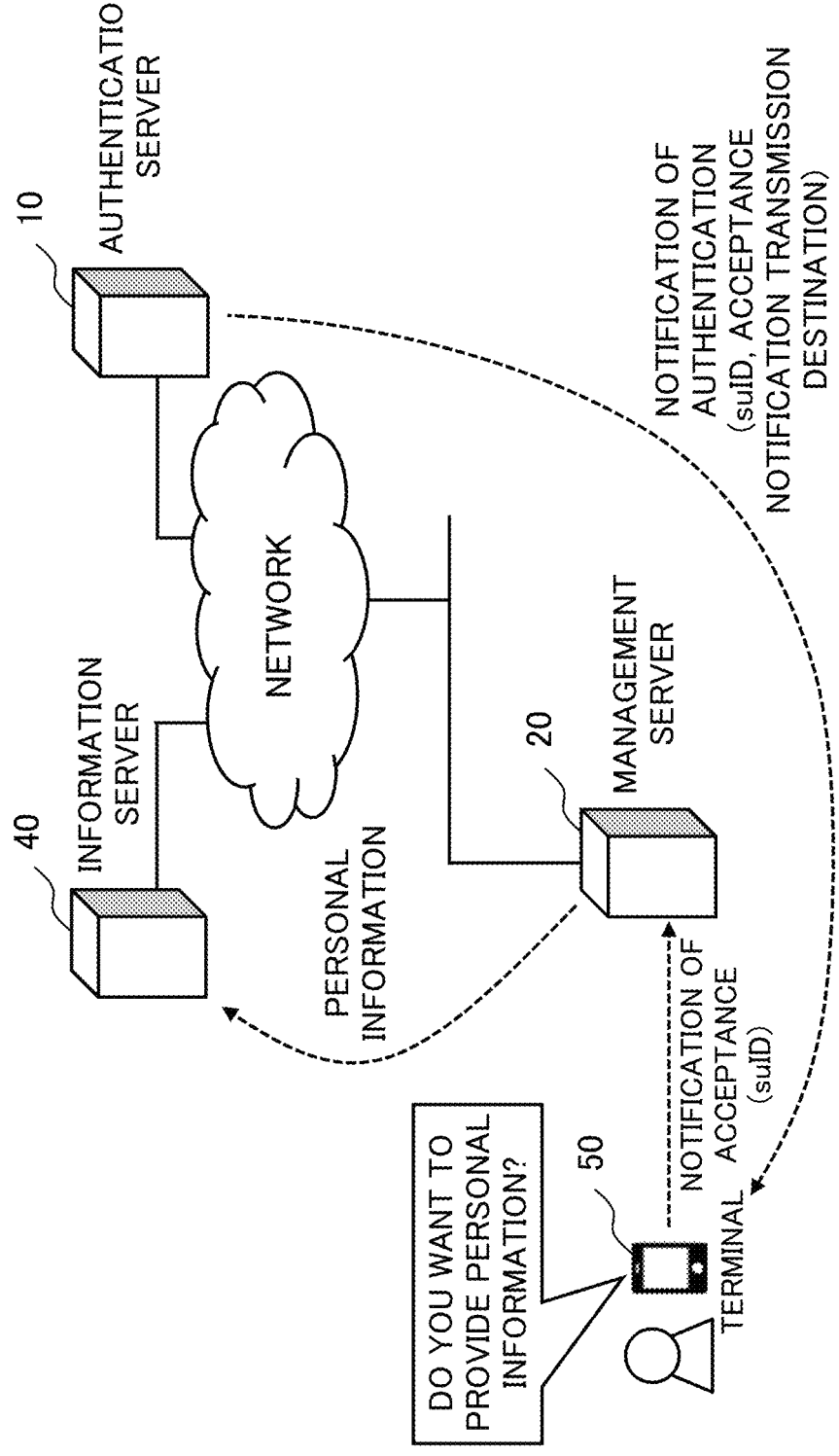
FIG. 6 is a diagram for explaining an operation in a personal information collection phase of the authentication system according to the first example embodiment.

FIG. 6 is a diagram for explaining an operation in a personal information collection phase of the authentication system according to the first example embodiment.

In the service providing phase, when the authentication server 10 authenticates the user, the fact is notified to the user. Specifically, the authentication server 10 transmits a "notification of authentication" to the terminal 50 possessed by the user.

The notification of authentication includes the service user ID of the service provider from which the user receives the service. The notification of authentication includes information regarding a transmission destination of the notification of acceptance (hereinafter, referred to as acceptance notification transmission destination information). The acceptance notification transmission destination information is information regarding the management server 20 serving as a transmission destination of a "notification of acceptance" to be described later. For example, an Internet protocol (IP) address of the management server 20 as a transmission destination of the notification of acceptance is exemplified as the acceptance notification transmission destination information.

When the notification of authentication is received, the terminal 50 generates a graphical user interface (GUI) for inputting availability regarding provision of the personal information to the information server 40 (whether the user accepts the provision of the personal information). That is, the terminal 50 acquires an intention (idea) of the user regarding whether the user agrees to provide the personal information stored in the management server 20 to the information server 40 using the GUI.

If the user refuses to provide the personal information to the information server 40, the terminal 50 does not perform any particular operation.

When the user accepts the provision of the personal information to the information server 40, the terminal 50 notifies the management server 20 of the acceptance. At that time, the terminal 50 notifies the management server 20 relevant to the acceptance notification transmission destination information of the acceptance (acceptance of the user) of the personal information provision. In the following description, "accept the provision of personal information" notified from the terminal 50 to the management server 20 is referred to as "notification of acceptance".

The notification of acceptance transmitted by the terminal 50 includes the service user ID acquired from the authentication server 10.

Upon receiving the notification of acceptance, the management server 20 retrieves the user information database using the acquired service user ID as a key, and specifies the relevant personal information. The management server 20 transmits the specified personal information to the information server 40.

The information server 40 stores the received personal information.

For example, in the example of FIG. 2, a case where a face image is photographed by an authentication terminal 30-1 of the service provider S1 will be considered. In this case, when the authentication of the user is successful, the authentication server 10 notifies the user (the terminal 50 possessed by the user) of the fact as a "notification of authentication". The terminal 50 generates a GUI for inputting the intention of the user regarding the provision of the personal information. When the user agrees to provide the personal information, the terminal 50 transmits a "notification of acceptance" to a management server 20-1 installed in the service provider S1. Upon receiving the notification of acceptance, the management server 20-1 transmits the relevant personal information to the information server 40.

Normally, it is assumed that the user does not agree to the provision of the personal information unless there is a benefit to the provision of the personal information. Therefore, it is desirable to present and propose a benefit for personal information provision to the user. For example, it is conceivable to give a user a coupon, a point, or the like that can be used by a service provider as a benefit. Various forms are conceivable regarding the benefit to be given and how to give the benefit, and the detailed description thereof will be omitted because it is different from the gist of the disclosure of the present application.

In this manner, in the personal information collection phase, when the biometric authentication of the user is successful, the authentication server 10 transmits, to the terminal 50, the "notification of authentication" indicating that the biometric authentication of the user is successful. In response to the reception of the notification of authentication, the terminal 50 transmits, to the management server 20, a "notification of acceptance" indicating that the user has accepted the provision of the personal information stored in the management server 20 to the information server 40. In response to receiving the notification of acceptance, the management server 20 transmits the personal information of the user to the third party (the information server 40). In a case where the user receives the notification of authentication even though the user does not remember receiving the biometric authentication, the user can suspect another person's impersonating of the user. In this case, the user can make an inquiry to the administrator or the like of the authentication center.

Next, details of each device included in the authentication system according to the first example embodiment will be described.

[Authentication Server]

Figure 7:
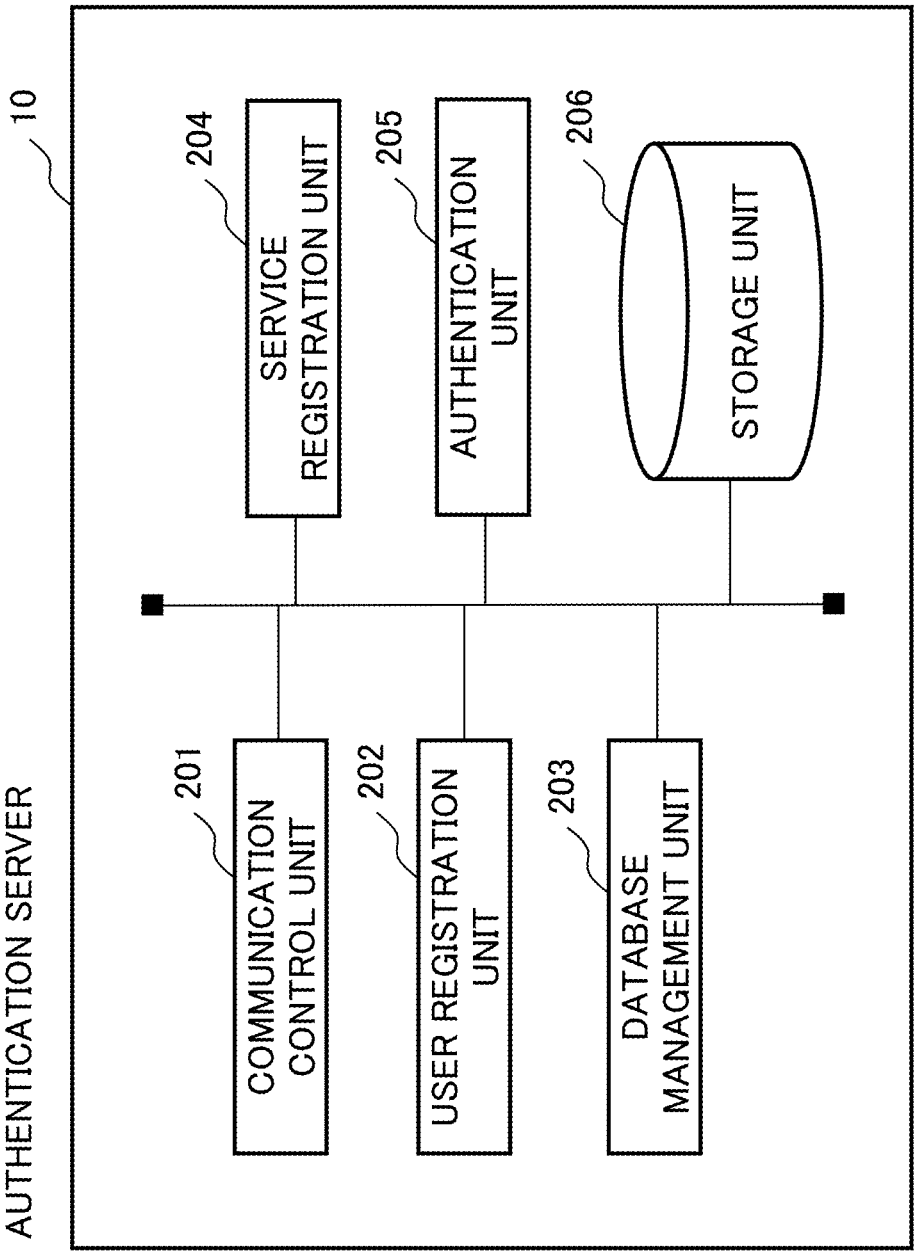
FIG. 7 is a diagram illustrating an example of a processing configuration of an authentication server according to the first example embodiment.

FIG. 7 is a diagram illustrating an example of a processing configuration (processing module) of the authentication server 10 according to the first example embodiment. Referring to FIG. 7, the authentication server 10 includes a communication control unit 201, a user registration unit 202, a database management unit 203, a service registration unit 204, an authentication unit 205, and a storage unit 206.

The communication control unit 201 is a means that controls communication with other devices. For example, the communication control unit 201 receives data (packet) from the management server 20. The communication control unit 201 transmits data to the management server 20. The communication control unit 201 delivers data received from another device to another processing module. The communication control unit 201 transmits data acquired from another processing module to another device. In this manner, the another processing modules transmit and receive data to and from other devices via the communication control unit 201.

The user registration unit 202 is a means that achieves the user registration described above. The user registration unit 202 is configured to acquire a user ID, a password, biometric information (face image), and a contact address (a transmission destination of a notification of authentication) of the user (a user who wishes to provide a service using biometric authentication; a system user).

Figure 8:
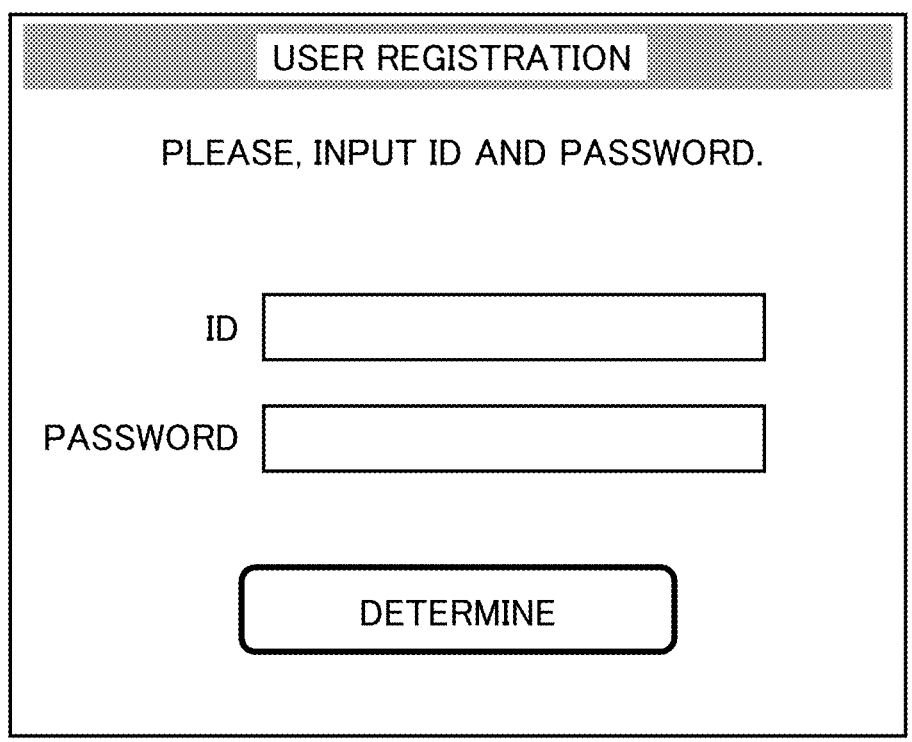
FIG. 8 is a diagram for explaining an operation of a user registration unit of the authentication server according to the first example embodiment.

The user registration unit 202 acquires the four pieces of information (user ID, password, biometric information, contact address) using any means. For example, the user registration unit 202 displays a GUI or an input form for determining the user ID and the password on the terminal 50. For example, the user registration unit 202 displays a GUI as illustrated in FIG. 8 on the terminal 50.

The user registration unit 202 verifies that the user ID and the password acquired by the GUI or the like do not overlap with the already registered user ID and password. When the duplication does not occur, the user registration unit 202 displays a GUI for acquiring the biometric information and the contact address of the user on the terminal 50.

Figure 9:
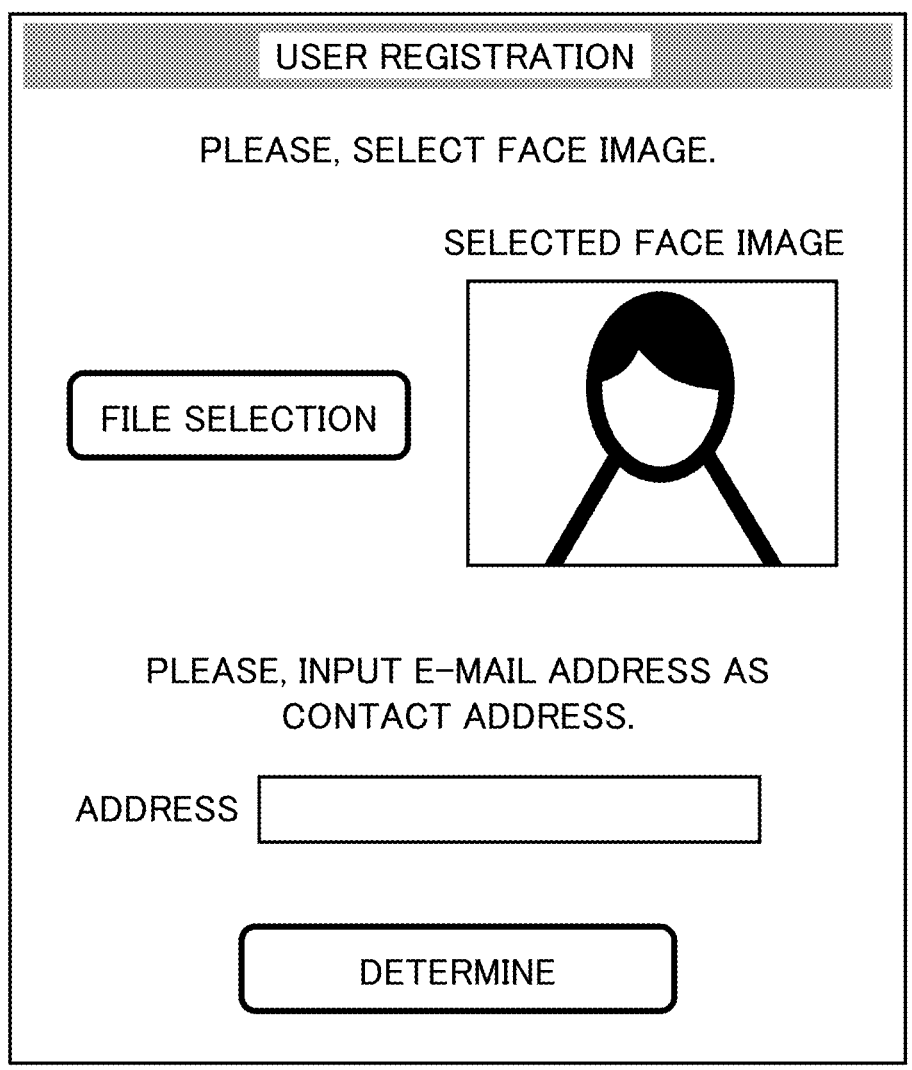
FIG. 9 is a diagram for explaining an operation of the user registration unit of the authentication server according to the first example embodiment.

For example, the user registration unit 202 displays a GUI as illustrated in FIG. 9 on the terminal 50. For example, the user presses a "file selection" button illustrated in FIG. 9 to specify image data of a face image to be registered in the system. The specified face image is displayed in a preview area (displayed as a selected face image in FIG. 9).

The user inputs an e-mail address of an account that can be received by the terminal 50 to the contact address. To register the previewed face image or contact address, the user presses a "determine" button.

For example, when acquiring the user ID, the password, the biometric information (face image), and the contact address by the GUI as illustrated in FIGS. 8 and 9, the user registration unit 202 generates a feature amount (a feature vector including a plurality of feature amounts) from the face image.

Specifically, the user registration unit 202 extracts feature points from the acquired face image. An existing technology can be used for the feature point extraction processing, and thus a detailed description thereof will be omitted. For example, the user registration unit 202 extracts eyes, a nose, a mouth, and the like as feature points from the face image. Thereafter, the user registration unit 202 calculates the position of each feature point and the distance between the feature points as feature amounts, and generates a feature vector (vector information characterizing the face image) including a plurality of feature amounts.

The user registration unit 202 passes the user ID, the password, the contact address, and the generated feature amount to the database management unit 203.

The database management unit 203 is a means that manages the authentication information database. The authentication information database stores information for specifying a system user (user ID, password), a contact address of the user, biometric information (feature amount), a service provider ID for specifying a service provider, and a service user ID for specifying a user in each service in association with each other.

When acquiring the four pieces of information (user ID, password, feature amount, contact address) from the user registration unit 202, the database management unit 203 adds a new entry to the authentication information database. For example, in a case where the above-described four pieces of information regarding the user U1 are acquired, the database management unit 203 adds an entry illustrated in the lowermost stage of FIG. 10. Since the service provider ID and the service user ID are not generated at the stage of user registration, nothing is set in these fields.

The service registration unit 204 is a means that achieves individual service registration by the system user. The service registration unit 204 processes a service registration request acquired from the management server 20 of the service provider.

The service registration unit 204 retrieves the authentication information database using the user ID and the password included in the acquired service registration request as keys. The service registration unit 204 checks a service provider ID field of the specified user (a user identified from a set of user ID and password).

The service registration unit 204 determines whether the service provider ID included in the service registration request acquired from the management server 20 is set in the service provider ID field. If the service provider ID acquired from the management server 20 has already been registered in the database, the service registration unit 204 notifies the management server 20 of the fact. In this case, since the service (service provider) to be registered by the user is already registered in the authentication information database, the service registration unit 204 transmits a "negative response" as a response to the service registration request.

On the other hand, when the service provider ID included in the service registration request is not set in the service provider ID field of the specified user, the service registration unit 204 generates a service user ID relevant to the user and the service provider.

As described above, the service user ID is identification information uniquely determined from a combination of a user and a service provider. For example, the service registration unit 204 calculates a hash value using the user ID, the password, and the service provider ID, and sets the calculated hash value as the service user ID. Specifically, the service registration unit 204 calculates a concatenated value of the user ID, the password, and the service provider ID, and calculates a hash value of the calculated concatenated value to generate the service user ID.

The generation of the service user ID using the hash value is an example and is not intended to limit the method of generating the service user ID. The service user ID may be any information as long as the information can uniquely identify the combination of the system user and the service provider. For example, the service registration unit 204 may assign a unique value each time the service registration request is processed to obtain the service user ID.

When the service user ID is generated, the service registration unit 204 delivers the service provider ID and the service user ID to the database management unit 203 together with the user ID, the password, and the like. The database management unit 203 registers two IDs (service provider ID, service user ID) in the authentication information database. For example, when the user U1 registers a service for the service provider S1, the two IDs are added to the entry illustrated at the bottom of FIG. 11.

Since service registration is performed for each service provider, a plurality of service providers and service user IDs may be set for one user. For example, in a case where the user U1 performs service registration for each of the service providers S1 and S2, the entries of the second and third lines of FIG. 12 are generated. In a case where a user U2 performs service registration for the service provider S1, the entry at the bottom of FIG. 12 is generated.

The authentication information database illustrated in FIG. 12 and the like is an example and is not intended to limit information stored in the authentication information database. For example, instead of the feature amount for authentication, a face image may be registered in the authentication information database. That is, the feature amount may be generated from the face image registered in the authentication information database each time authentication is performed.

When the service provider ID and the service user ID are registered in the authentication information database, the service registration unit 204 notifies the management server 20 that the service registration request is normally processed. The service registration unit 204 transmits an "affirmative response" as a response to the service registration request. At that time, the service registration unit 204 transmits a response including the service user ID to the management server 20.

The authentication unit 205 is a means that performs an authentication process of the system user. The authentication unit 205 processes an authentication request received from the management server 20 of the service provider.

The authentication unit 205 extracts the feature amount and the service provider ID included in the authentication request. The authentication unit 205 retrieves the authentication information database using the extracted feature amount and service provider ID as keys, and specifies the relevant service user ID.

The authentication unit 205 sets the feature amount extracted from the authentication request as a feature amount on the collation side and the feature amount stored in the database as a feature amount on the registration side, and executes the one-to-N collation. Specifically, the authentication unit 205 calculates the similarity between the feature amount on the collation side and the feature amount of each of the plurality of registration sides. A chi-square distance, a Euclidean distance, or the like can be used as the similarity. The similarity is lower as the distance is longer, and the similarity is higher as the distance is shorter.

The authentication unit 205 determines whether there is a feature amount having a similarity with the feature amount of the collation target equal to or greater than a predetermined value and having the highest similarity among the plurality of feature amounts registered in the database. In a case where such a feature amount exists, the authentication unit 205 determines whether there is an entry matching the service provider ID included in the authentication request among at least one or more service provider IDs associated with the user specified by the one-to-N matching.

When the entry as described above exists (when the above two determinations are successful), the authentication unit 205 determines that the authentication of the user is successful. In this case, the authentication unit 205 transmits an "affirmative response" to the management server 20 which is a transmission source of the authentication request. At that time, the authentication unit 205 generates a response (response to the authentication request) including the service user ID of the specified entry and transmits the response to the management server 20.

When at least one of the two determinations fails, the authentication unit 205 determines that the authentication of the user fails. In this case, the authentication unit 205 transmits a "negative response" to the management server 20 which is a transmission source of the authentication request.

For example, in the example of FIG. 12, in a case where the feature amount of "FV1" and the service provider ID of "S1" are included in the authentication request, the entries (users) of the second and third lines are specified by the feature amount FV1, and the entry of the second line is specified by the service provider ID "S1". As a result, the authentication request is normally processed, and an affirmative response including the service user ID of "U1S1" is transmitted to the management server 20.

On the other hand, when the feature amount of "FV2" and the service provider ID of "S2" are included in the authentication request, the lowermost entry is specified by the feature amount, but since the service provider ID of the entry is not "S2" but "S1", the authentication request is not normally processed. As a result, a negative response is transmitted to the management server 20.

When the authentication of the user is successful, the authentication unit 205 transmits a "notification of authentication" to the relevant contact address. Specifically, the authentication unit 205 transmits the notification of authentication to the address described in the contact field of the entry specified by the collation processing. At that time, the authentication unit 205 generates a notification of authentication including the service user ID specified by the collation processing and the notification of acceptance transmission destination, and transmits the generated notification of authentication to the terminal 50. The authentication unit 205 may set the IP address of the management server 20 that has transmitted the response to the authentication request as the notification of acceptance transmission destination.

The storage unit 206 stores information necessary for the operation of the authentication server 10. In the storage unit 206, an authentication information database is constructed.

[Management Server]

Figure 13:
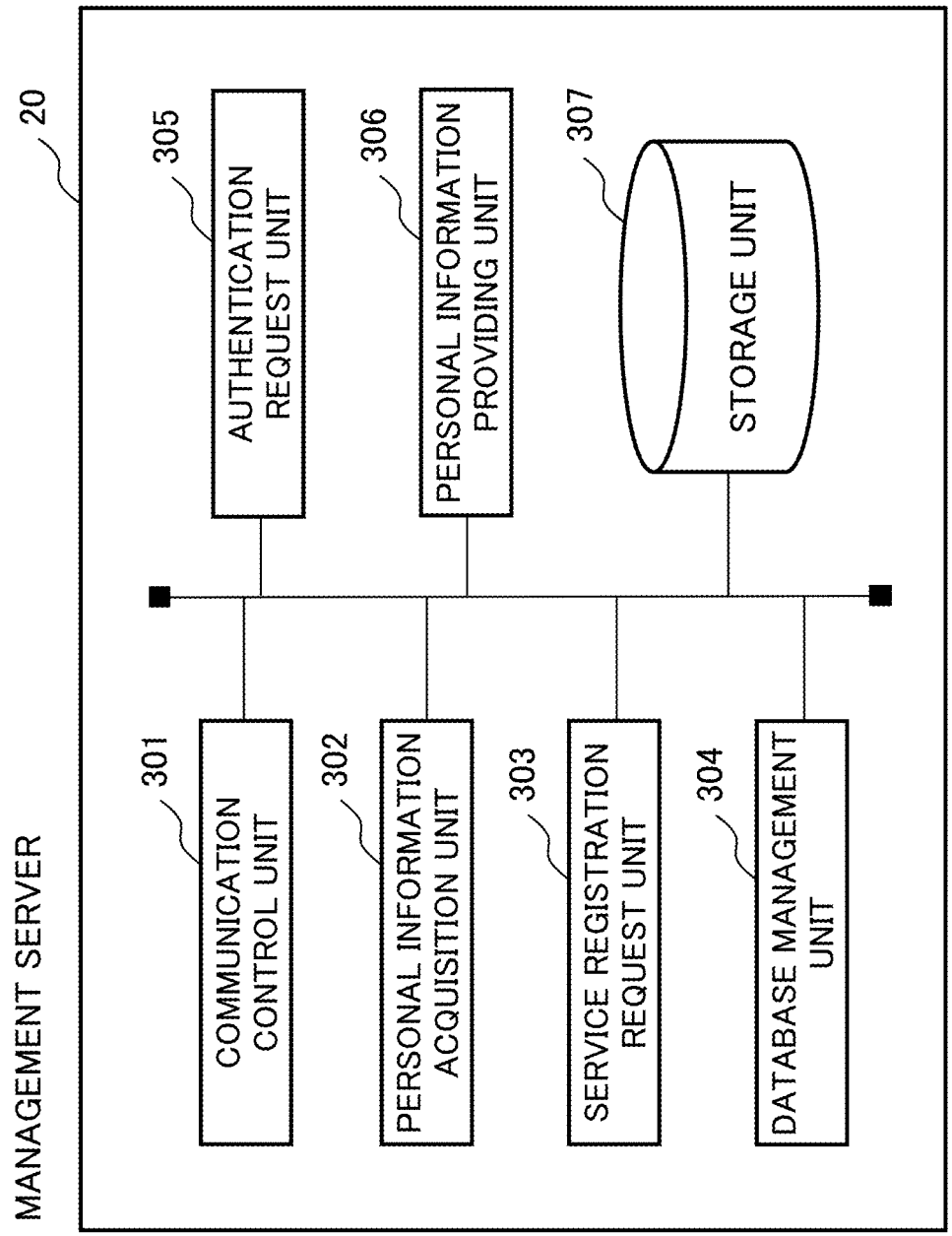
FIG. 13 is a diagram illustrating an example of a processing configuration of a management server according to the first example embodiment.

FIG. 13 is a diagram illustrating an example of a processing configuration (processing module) of the management server 20 according to the first example embodiment. Referring to FIG. 13, the management server 20 includes a communication control unit 301, a personal information acquisition unit 302, a service registration request unit 303, a database management unit 304, an authentication request unit 305, a personal information providing unit 306, and a storage unit 307.

The communication control unit 301 is a means that controls communication with other devices. For example, the communication control unit 301 receives data (packet) from the authentication server 10, the authentication terminal 30, and the like. The communication control unit 301 transmits data to the authentication server 10, the authentication terminal 30, and the like. The communication control unit 301 delivers data received from another device to another processing module. The communication control unit 301 transmits data acquired from another processing module to another device. In this manner, the another processing module transmits and receive data to and from other devices via the communication control unit 301.

The personal information acquisition unit 302 is a means that acquires personal information required when a service provider provides a service. For example, in a case where the service provider is a "retail store", the personal information acquisition unit 302 acquires information regarding payment (for example, credit card information and bank account information.) in addition to the user's name and the like. Alternatively, in a case where the service provider is a "hotel business operator", the personal information acquisition unit 302 acquires reservation information regarding accommodation (for example, the date of staying, and the like) in addition to a name and the like.

In addition to the personal information such as the name, the personal information acquisition unit 302 acquires a user ID and a password determined by the user at the time of system registration.

The personal information acquisition unit 302 acquires the personal information, the user ID, and the password using any means. For example, the personal information acquisition unit 302 displays a GUI or a form for inputting the above information on the terminal 50 (see FIG. 14). Alternatively, the information as illustrated in FIG. 14 may be displayed on a web page managed and operated by the service provider. Alternatively, the terminal 50 may download an application provided by the service provider, and the displaying as illustrated in FIG. 14 may be performed by the application. In particular, the web page may be a web page that manages member information of a service provider. That is, a member of each service provider may perform service registration on a web page that manages his/her member information.

The personal information acquisition unit 302 delivers the personal information, the user ID, and the password acquired using the GUI or the like to the service registration request unit 303.

The service registration request unit 303 is a means that requests (requests) the authentication server 10 to register the service use of the user.

The service registration request unit 303 selects a user ID and a password from the three pieces of information (personal information, user ID, password) acquired from the personal information acquisition unit 302. The service registration request unit 303 transmits a service registration request including the selected user ID, password, and service provider ID to the authentication server 10.

The service registration request unit 303 acquires a response to the service registration request from the authentication server 10. In a case where the acquired response is a "negative response", the service registration request unit 303 notifies the user of the fact. For example, the service registration request unit 303 notifies the user that service registration has already been performed.

In a case where the acquired response is an "affirmative response", the service registration request unit 303 notifies the user that the service registration is successful. The service registration request unit 303 delivers the service user ID included in the response and the personal information acquired from the personal information acquisition unit 302 to the database management unit 304.

The database management unit 304 is a means that manages the user information database. The user information database is a database that manages information on users (system users) who are service provision targets. The user information database stores personal information (for example, name and the like) of the user and the service user ID acquired from the authentication server 10 in association with each other.

When acquiring the information (personal information, service user ID) from the service registration request unit 303, the database management unit 304 adds a new entry to the user information database. For example, in a case where the management server 20 of the service provider S1 acquires the information regarding the user U1, an entry illustrated at the bottom of FIG. 15 is added.

The authentication request unit 305 is a means that requests the authentication server 10 to authenticate the user.

When acquiring the biometric information (face image) from the authentication terminal 30, the authentication request unit 305 generates a feature amount from the face image. The authentication request unit 305 transmits an authentication request including the generated feature amount and the service provider ID to the authentication server 10.

In a case where the response from the authentication server 10 is a "negative response" (in a case of authentication failure), the authentication request unit 305 notifies the authentication terminal 30 of the fact.

In a case where the response from the authentication server 10 is an "affirmative response" (in a case of successful authentication), the authentication request unit 305 extracts the service user ID included in the response from the authentication server 10. The authentication request unit 305 retrieves the user information database using the service user ID as a key, and specifies a relevant entry.

The authentication request unit 305 reads the personal information set in the personal information field of the specified entry, and transmits the personal information to the authentication terminal 30. For example, in the example of FIG. 15, when the service user ID is "U1S1", the personal information at the bottom is transmitted to the authentication terminal 30.

The personal information providing unit 306 is a means that provides personal information of the user who has provided the service to the information server 40.

The personal information providing unit 306 receives the "notification of acceptance" from the terminal 50 of the user. The personal information providing unit 306 extracts the service user ID included in the notification of acceptance. The personal information providing unit 306 retrieves the user information database using the extracted service user ID as a key, and specifies the relevant personal information.

The personal information providing unit 306 transmits the specified personal information to the information server 40.

The storage unit 307 stores information necessary for the operation of the management server 20. The user information database is constructed in the storage unit 307.

[Authentication Terminal]

The authentication terminal 30 acquires the personal information of the user from the management server 20 by transmitting the biometric information acquired from the user to the management server 20. The authentication terminal 30 provides a service to the user using the acquired personal information.

Figure 16:
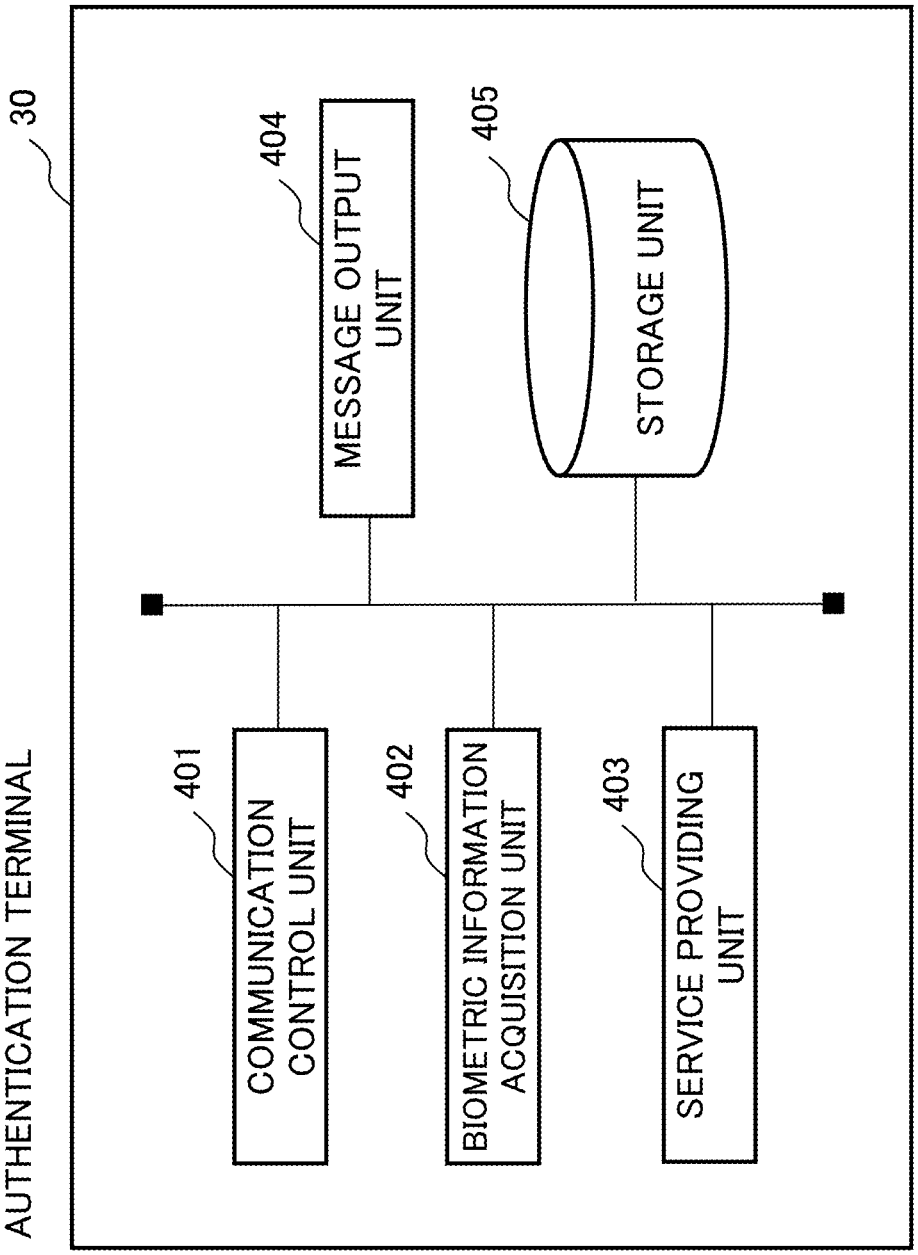
FIG. 16 is a diagram illustrating an example of a processing configuration of an authentication terminal according to the first example embodiment.

FIG. 16 is a diagram illustrating an example of a processing configuration (processing module) of the authentication terminal 30 according to the first example embodiment. Referring to FIG. 16, the authentication terminal 30 includes a communication control unit 401, a biometric information acquisition unit 402, a service providing unit 403, a message output unit 404, and a storage unit 405.

The communication control unit 401 is a means that controls communication with other devices. For example, the communication control unit 401 receives data (packet) from the management server 20. The communication control unit 401 transmits data to the management server 20. The communication control unit 401 delivers data received from another device to another processing module. The communication control unit 401 transmits data acquired from another processing module to another device. In this manner, the other processing modules transmit and receive data to and from other devices via the communication control unit 401.

The biometric information acquisition unit 402 is a means that controls the camera and acquires the biometric information (face image) of the user. The biometric information acquisition unit 402 images the front of the own device periodically or at a predetermined timing. The biometric information acquisition unit 402 determines whether a face image of a person is included in the acquired image, and extracts the face image from the acquired image data when the face image is included.

Since an existing technology can be used for the face image detection processing and the face image extraction processing by the biometric information acquisition unit 402, detailed description thereof will be omitted. For example, the biometric information acquisition unit 402 may extract a face image (face area) from the image data by using a learning model learned by a convolutional neural network (CNN). Alternatively, the biometric information acquisition unit 402 may extract the face image using a method such as template matching.

The biometric information acquisition unit 402 delivers the extracted face image to the service providing unit 403.

The service providing unit 403 is a means that provides a predetermined service to a user. The service providing unit 403 transmits the face image acquired from the biometric information acquisition unit 402 to the management server 20. The management server 20 returns personal information (for example, name and the like) relevant to the face image. The service providing unit 403 provides a service to the user using the returned personal information.

The message output unit 404 is a means that outputs various messages to the user. For example, the message output unit 404 outputs a message regarding an authentication result of the user or a message regarding service provision. The message output unit 404 may display a message using a display device such as a liquid crystal monitor, or may reproduce a voice message using an acoustic device such as a speaker.

The storage unit 405 stores information necessary for the operation of the authentication terminal 30.

[Terminal]

Figure 17:
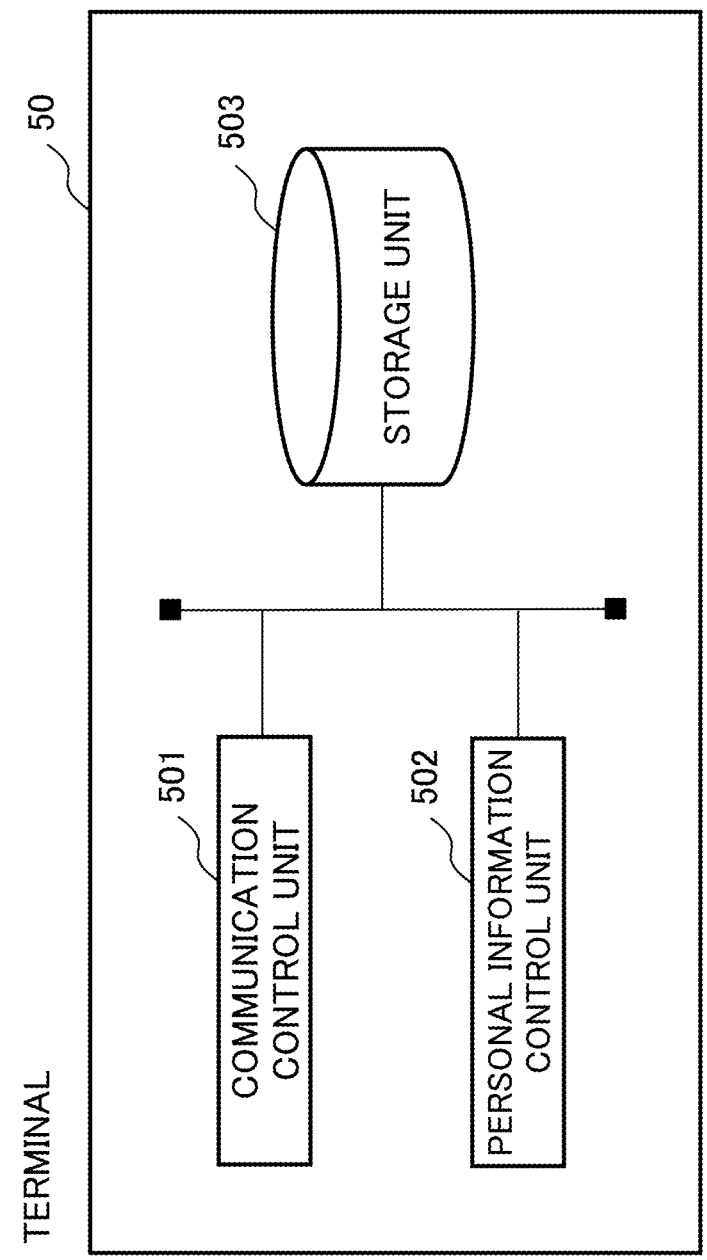
FIG. 17 is a diagram illustrating an example of a processing configuration of a terminal according to the first example embodiment.

FIG. 17 is a diagram illustrating an example of a processing configuration (processing module) of the terminal 50 according to the first example embodiment. Referring to FIG. 17, the terminal 50 includes a communication control unit 501, a personal information control unit 502, and a storage unit 503.

The communication control unit 501 is a means that controls communication with other devices. For example, the communication control unit 501 receives data (packet) from the authentication server 10 or the like. The communication control unit 501 transmits data to the management server 20 and the like. The communication control unit 501 delivers data received from another device to another processing module. The communication control unit 501 transmits data acquired from another processing module to another device. In this manner, the other processing modules transmit and receive data to and from other devices via the communication control unit 501.

The personal information control unit 502 is a means that controls whether to provide the personal information held by the service provider to the information server 40 according to the intention of the user.

Figure 18:
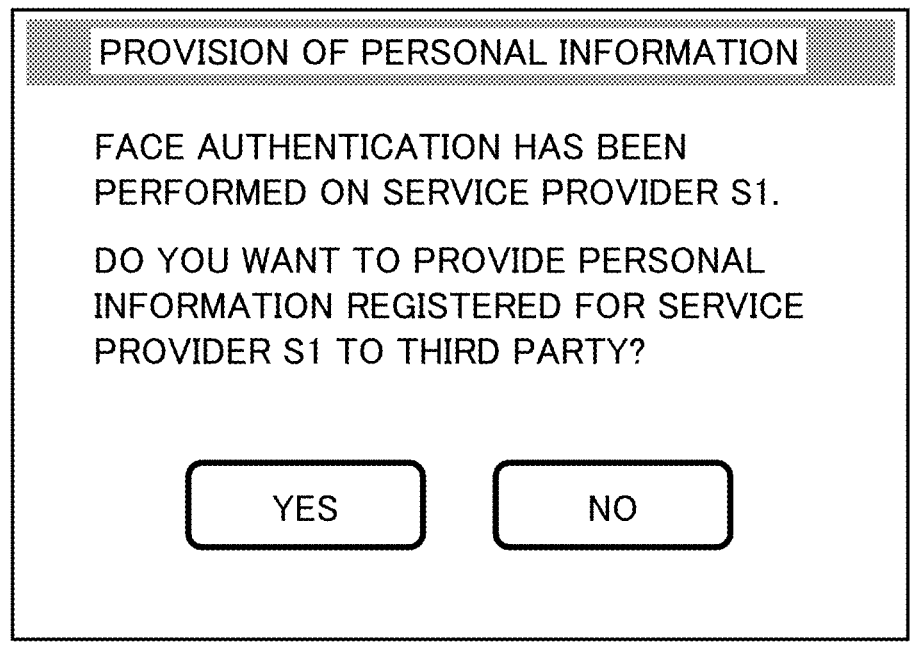
FIG. 18 is a diagram for explaining an operation of a personal information control unit of the terminal according to the first example embodiment.

Upon receiving the notification of authentication from the authentication server 10, the personal information control unit 502 acquires the intention of the user regarding whether to approve provision of the personal information stored in the management server 20 to the information server 40. Specifically, the personal information control unit 502 generates a GUI for inputting whether the user desires to provide the personal information. For example, the personal information control unit 502 generates a GUI as illustrated in FIG. 18 and acquires availability regarding provision of the personal information. In a case where the user does not perform any operation for a predetermined period of time, the personal information control unit 502 may automatically select either operation of providing or rejection of the personal information and proceed with the processing. For example, in FIG. 18, in a case where the "YES" button has not been pressed during a predetermined period of time, the personal information control unit 502 may determine that the "No" button has been pressed.

Figure 19:
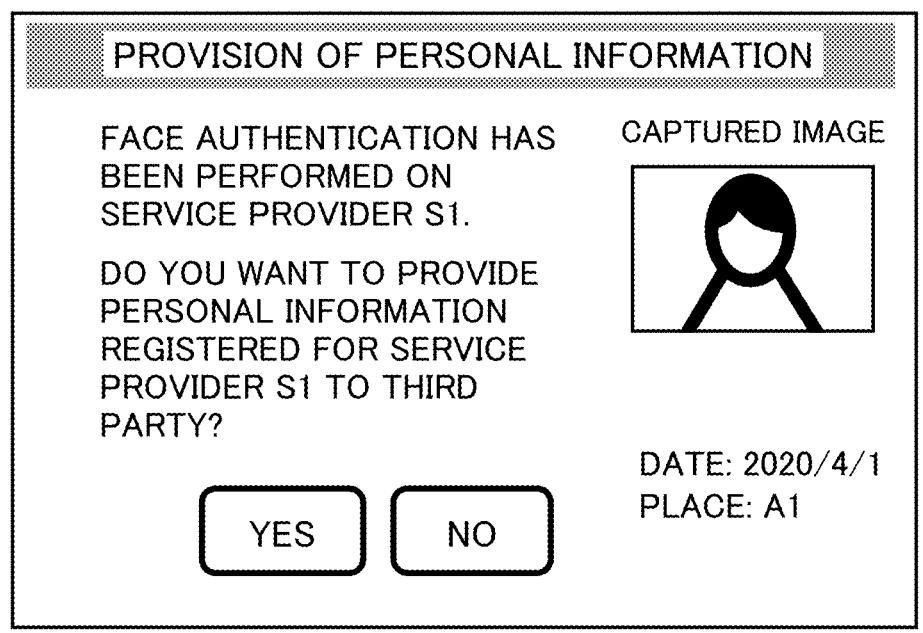
FIG. 19 is a diagram for explaining an operation of a personal information control unit of the terminal according to the first example embodiment.

The display illustrated in FIG. 18 is an example. For example, as illustrated in FIG. 19, the personal information control unit 502 may display details of authentication by the authentication server 10 (authentication result, authentication date and time, authentication place, authenticated face image (captured image)).

Figure 20:
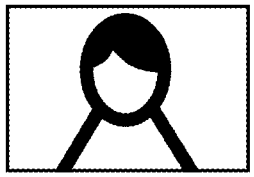
FIG. 20 is a diagram for explaining an operation of the personal information control unit of the terminal according to the first example embodiment.

Alternatively, as illustrated in FIG. 20, the personal information control unit 502 may generate a GUI for inputting a valid period of the provided personal information. The personal information control unit 502 also notifies the information server 40 of the acquired period. The information server 40 stores the personal information for the designated period, and discards the personal information after the period has elapsed.

Figure 21:
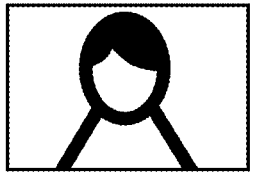
FIG. 21 is a diagram for explaining an operation of the personal information control unit of the terminal according to the first example embodiment.

Alternatively, as illustrated in FIG. 21, the personal information control unit 502 may generate a GUI that allows the user to select personal information to be provided. The user who contacts the display as illustrated in FIG. 21 individually selects a service (a destination of the personal information) to which the provision of the personal information can be accepted. Alternatively, the personal information control unit 502 may store (acquire) availability of personal information provision for each destination of the personal information for each user. The personal information control unit 502 may generate a GUI for inputting the valid period of the personal information provided for each provision destination of the personal information.

In a case where the user refuses to provide the personal information, the personal information control unit 502 does not perform any particular operation.

In a case where the user agrees to provide the personal information, the personal information control unit 502 transmits the notification of acceptance to the management server 20. At that time, the personal information control unit 502 transmits the notification of acceptance including the service user ID notified from the authentication server 10 to the management server 20 of the notification of acceptance transmission destination notified from the server.

The storage unit 503 stores information necessary for the operation of the terminal 50.

[Information Server]

Since a processing configuration (processing module) of the information server 40 is obvious to those skilled in the art, the description thereof will be omitted. The information server 40 may have a function of communicating with another device, a function of storing personal information, and the like.

[Operation of System]

Next, an operation of the authentication system according to the first example embodiment will be described. The operation will be described with respect to the service registration phase, the service providing phase, and the personal information collection phase, and the description of the user registration phase will be omitted.

Figure 22:
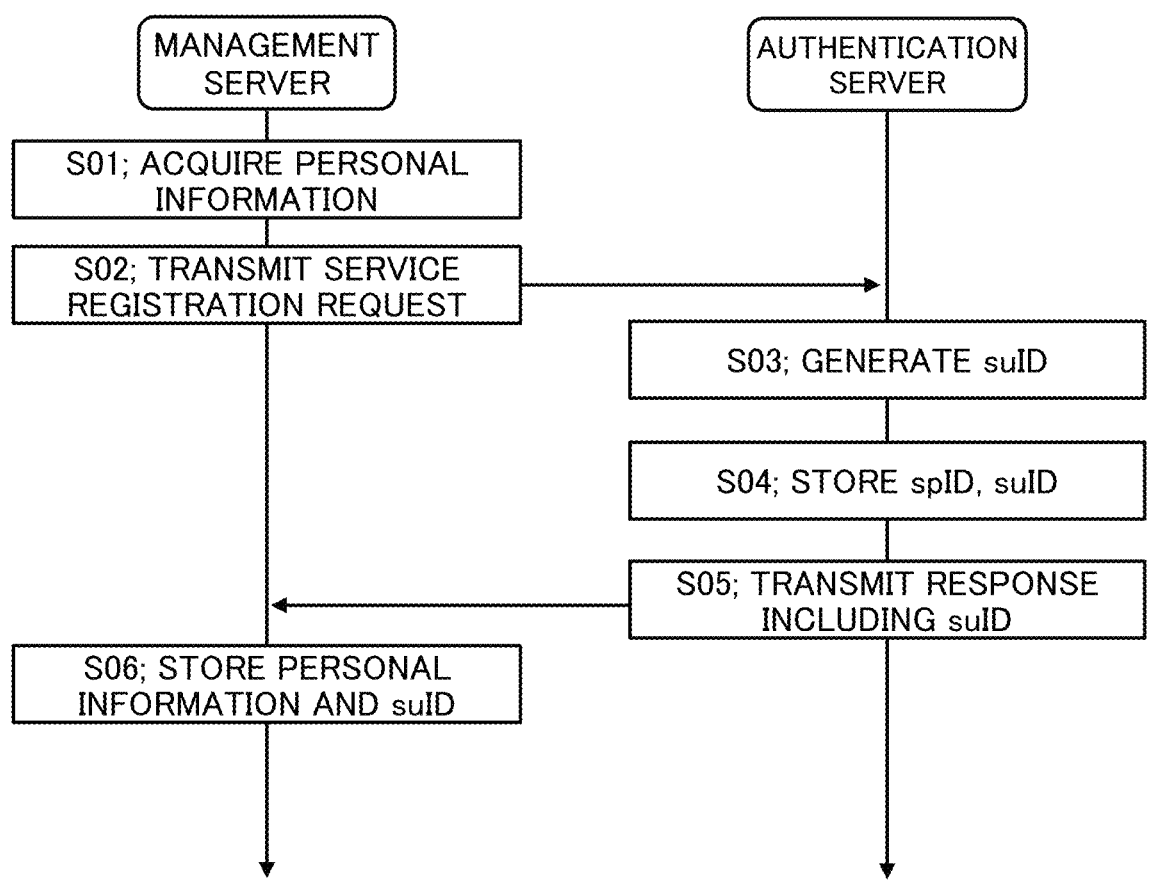
FIG. 22 is a sequence diagram illustrating an example of an operation related to the service registration phase of the authentication system according to the first example embodiment.

FIG. 22 is a sequence diagram illustrating an example of the operation related to the service registration phase of the authentication system according to the first example embodiment.

The management server 20 acquires personal information (information necessary for providing a service), a user ID, and a password from the user (step S01).

The management server 20 transmits a service registration request including the acquired user ID, password, and service provider ID to the authentication server 10 (step S02).

The authentication server 10 generates a service user ID using the acquired user ID, password, and service provider ID (step S03).

The authentication server 10 stores the service provider ID and the service user ID in the authentication information database (step S04).

The authentication server 10 transmits a response including the service user ID (response to the service registration request) to the management server 20 (step S05).

The management server 20 stores the personal information acquired in step S01 and the service user ID acquired from the authentication server 10 in association with each other in the user information database (step S06).

In this manner, the management server 20 acquires the service user ID by transmitting an authentication request including the user ID, the password, and the service provider ID to the authentication server 10. The management server

20 stores the acquired service user ID and personal information of the user in association with each other.

Figure 23:
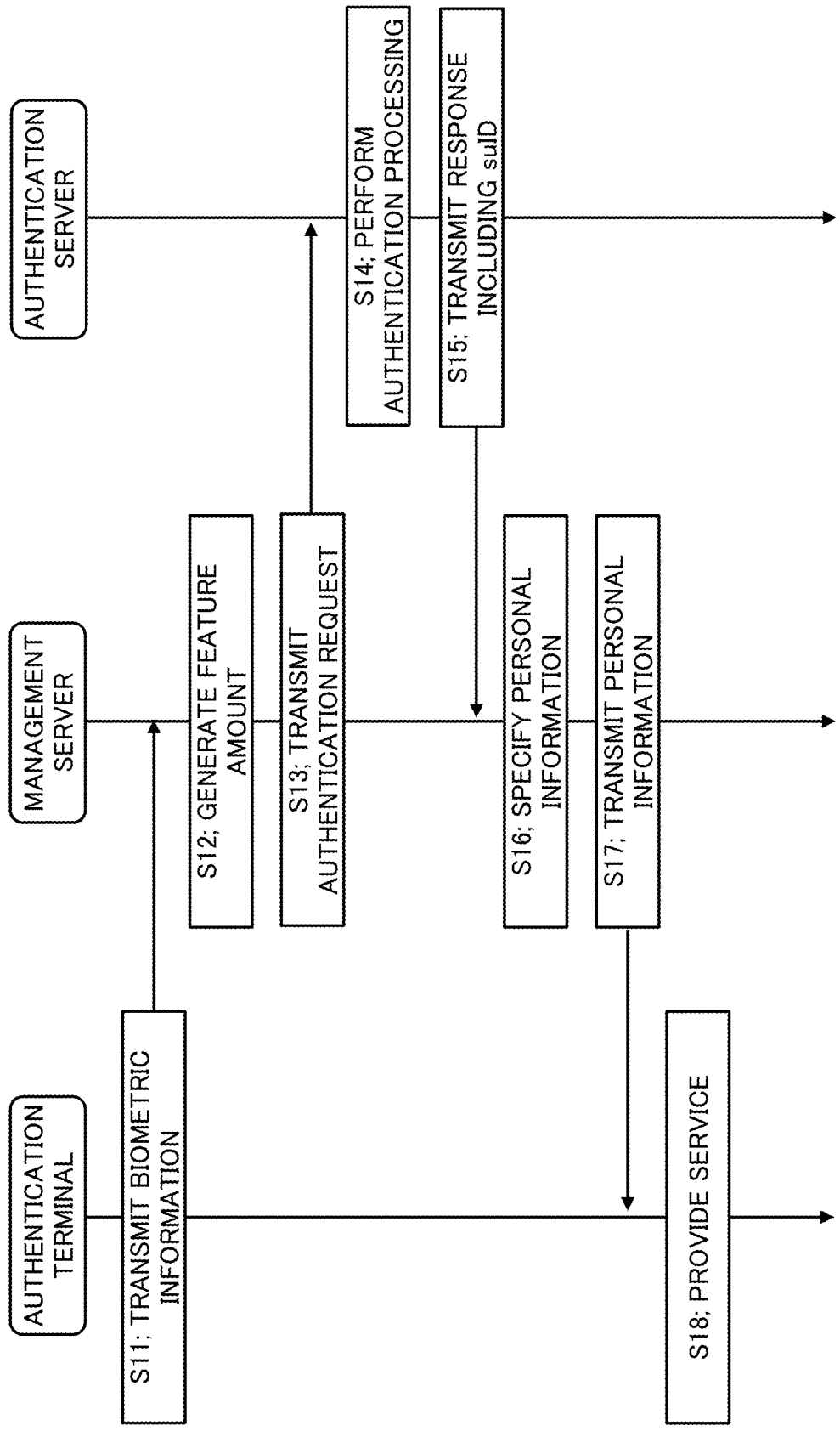
FIG. 23 is a sequence diagram illustrating an example of an operation related to the service providing phase of the authentication system according to the first example embodiment.

FIG. 23 is a sequence diagram illustrating an example of an operation related to a service providing phase of the authentication system according to the first example embodiment.

The authentication terminal 30 acquires a face image (biometric information) of the user and transmits the acquired face image to the management server 20 (step S11).

The management server 20 generates a feature amount from the acquired face image (step S12).

The management server 20 transmits an authentication request including the generated feature amount and the service provider ID to the authentication server 10 (step S13).

The authentication server 10 executes authentication processing using the feature amount included in the authentication request and the service provider ID, and specifies the relevant service user ID (step S14).

The authentication server 10 transmits a response (response to the authentication request) including the specified service user ID to the management server 20 (step S15).

The management server 20 retrieves the user information database using the acquired service user ID, and specifies the relevant personal information (step S16).

The management server 20 transmits the specified personal information to the authentication terminal 30 (step S17).

The authentication terminal 30 provides a service using the acquired personal information (step S18).

Figure 24:
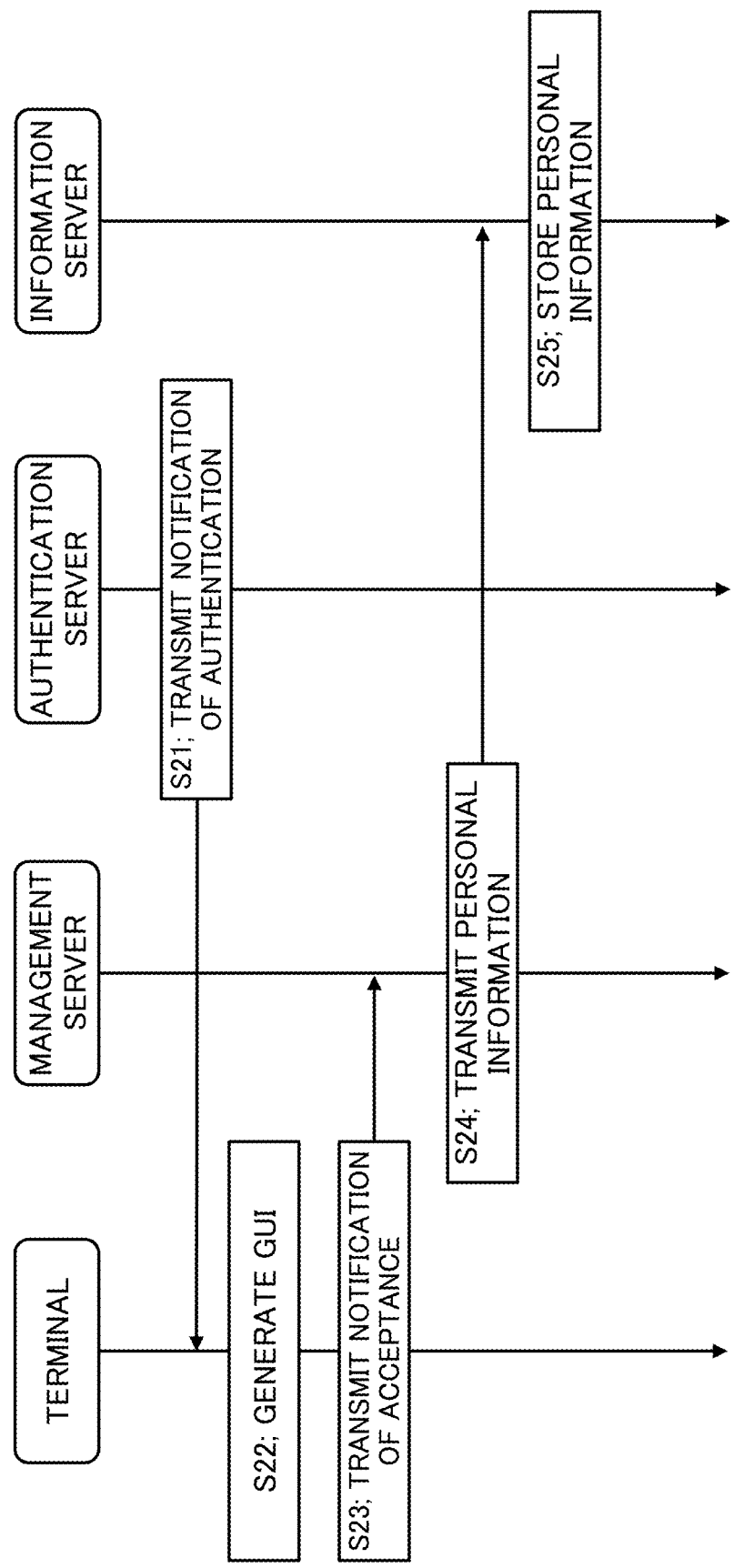
FIG. 24 is a sequence diagram illustrating an example of an operation related to the personal information collection phase of the authentication system according to the first example embodiment.

FIG. 24 is a sequence diagram illustrating an example of the operation related to the personal information collection phase of the authentication system according to the first example embodiment.

When the authentication of the user is successful, the authentication server 10 transmits a notification of authentication to the terminal 50 possessed by the user (step S21).

Upon receiving the notification of authentication, the terminal 50 generates a GUI for acquiring the intention of the user to provide the personal information to a third party (information center, information server 40) (step S22).

If the user agrees to provide the personal information, the terminal 50 transmits the notification of acceptance to the management server 20 (step S23).

Upon receiving the notification of acceptance, the management server 20 transmits the personal information of the user to the information server 40 (step S24).

The information server 40 stores the received personal information (step S25).

In this manner, the authentication server 10 transmits the notification of authentication including the service user ID and the transmission destination of the notification of acceptance (the acceptance notification transmission destination information) to the terminal 50. When the user agrees to provide the personal information, the terminal 50 transmits the notification of acceptance including the service user ID to the management server 20.

As described above, in the authentication system according to the first example embodiment, when the biometric authentication of the user is successful, the authentication server 10 notifies the fact to the user (terminal 50). The terminal 50 inquires of the user whether to provide the personal information related to the biometric authentication to a third party (for example, the information server 40). In a case where the user agrees to provide the personal information, the terminal 50 notifies the management server 20 of the agreement. In this manner, in the authentication system according to the first example embodiment, the user himself/herself can control and manage personal information related to service provision by biometric authentication.

In the authentication system according to the first example embodiment, the authentication server 10 performs centralized control related to biometric authentication of the user. By transmitting a notification of authentication from the authentication server 10 that performs such centralized control to the terminal 50, various benefits can be obtained. For example, it is conceivable to give a coupon or the like to the user in order to motivate the provision of the personal information. At that time, the authentication server 10 can give a coupon or the like related to a plurality of service providers to the user. For example, the authentication server 10 can give a coupon that can be used by the service providers S1 and S2 or give a coupon of the service provider S2 to a user who has provided personal information held by the service provider S1.

Second Example Embodiment

Next, a second example embodiment will be described in detail with reference to the drawings.

In the first example embodiment, the case where the authentication server 10 transmits the notification of authentication to the terminal 50 in the personal information collection phase has been described. In the second example embodiment, a case where the management server 20 transmits a notification of authentication will be described.

Since the configuration of the authentication system according to the second example embodiment can be the same as that of the first example embodiment, the description corresponding to FIG. 2 is omitted. Since the processing configurations of the authentication server 10, the management server 20, the authentication terminal 30, and the terminal 50 according to the second example embodiment can be the same as those of the first example embodiment, the description thereof will be omitted.

Hereinafter, differences between the first and second example embodiments will be mainly described.

In the user registration phase according to the second example embodiment, it is not necessary for the authentication server 10 to acquire the contact address (e-mail address) of the user. In the user registration phase according to the second example embodiment, the user may input the user ID, the password, and the biometric information (face image) to the authentication server 10.

In the service registration phase according to the second example embodiment, the management server 20 acquires the contact address of the user. The management server 20 acquires an e-mail address of an account that can be received by the terminal 50 as one of the personal information acquired from the user.

Regarding the service providing phase, the same operation can be performed in the first and second example embodiments.

Figure 25:
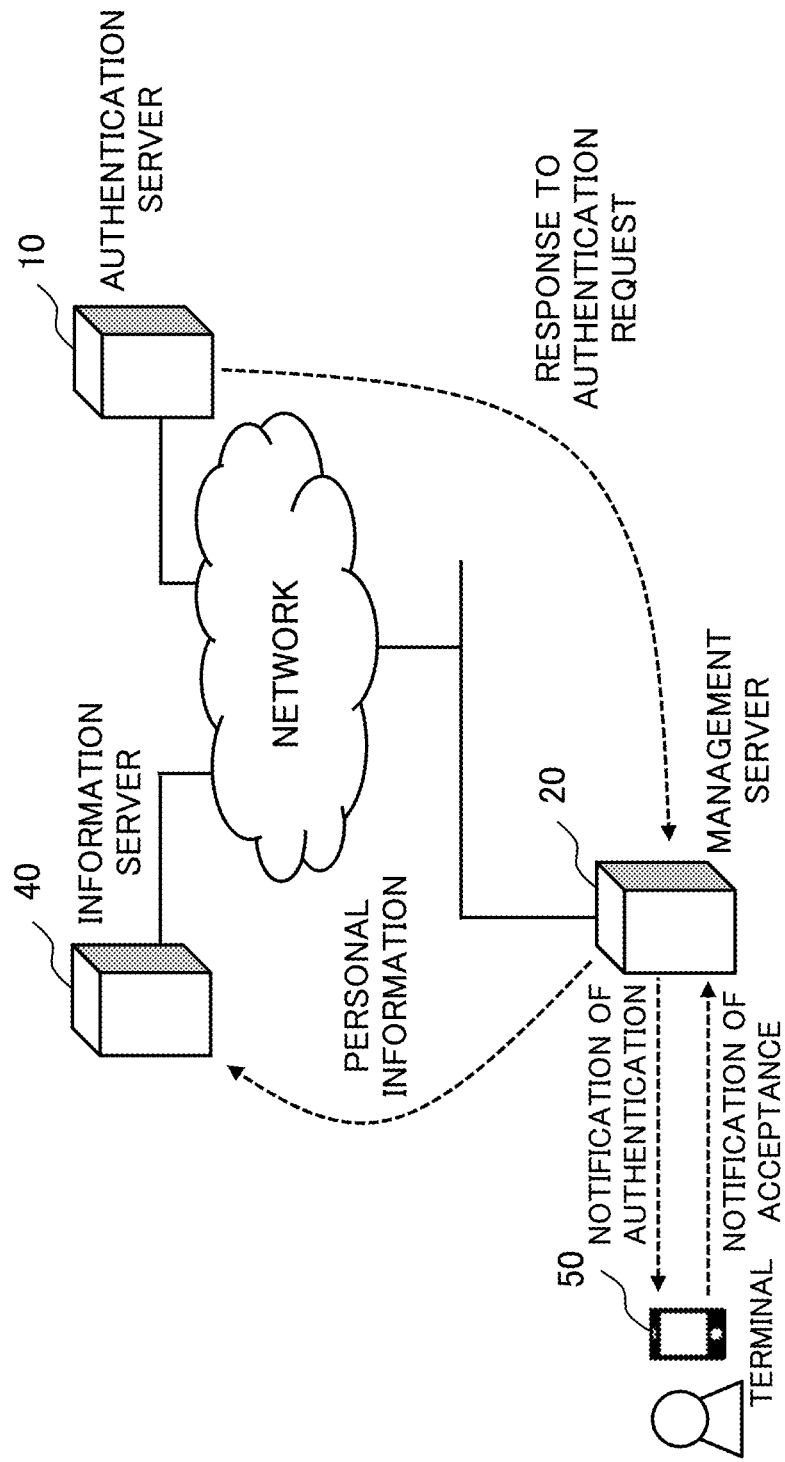
FIG. 25 is a diagram for explaining an operation of an authentication system in a personal information collection phase according to a second example embodiment.

FIG. 25 is a diagram for explaining the operation of the authentication system in the personal information collection phase according to the second example embodiment.

As illustrated in FIG. 25, when a response to the authentication request is received from the authentication server 10, the management server 20 transmits a "notification of authentication" to the user who has been successfully authenticated. The terminal 50 that has received the notification of authentication acquires availability related to the personal information provision from the user, and transmits the notification of acceptance to the management server 20 when the user agrees to provide the personal information.

The management server 20 transmits the personal information of the user to the information server 40.

Among the processing modules of the management server 20 according to the second example embodiment, a module having an operation different from that of the processing module of the management server 20 according to the first example embodiment will be described.

The personal information acquisition unit 302 acquires personal information including a contact address such as an e-mail address from the user.

When receiving a response to the authentication request from the authentication server 10, the authentication request unit 305 delivers the response to the personal information providing unit 306.

If the response is an affirmative response (authentication success), the personal information providing unit 306 retrieves the user information database using the service user ID included in the response as a key, and specifies the relevant personal information. The personal information providing unit 306 reads a contact address included in the specified personal information and transmits a notification of authentication to the contact address.

When the notification of acceptance is received from the terminal 50, the personal information providing unit 306 transmits the personal information of the user who has transmitted the notification of authentication to the information server 40.

The basic operation of the authentication server 10 and the terminal 50 according to the second example embodiment is the same as the operation described in the first example embodiment and is obvious to those skilled in the art, and thus the description thereof will be omitted. The authentication terminal 30 can perform the same operation in the first and second example embodiments.

The notification of authentication and the notification of acceptance transmitted and received in the second example embodiment may be any notification as long as it notifies the fact of authentication and the fact of acceptance, and do not need to include information (service user ID and the like) as described in the first example embodiment.

As described above, in the authentication system according to the second example embodiment, when the authentication server 10 succeeds in the biometric authentication of the user, the management server 20 transmits, to the terminal 50, the notification of authentication indicating that the biometric authentication of the user is successful. In response to the reception of the notification of authentication, the terminal 50 transmits, to the management server 20, the notification of acceptance that indicates that the user has accepted provision of the personal information stored in the management server 20 to the information server 40. According to the second example embodiment, the user can appropriately control and manage the personal information related to the service by the biometric authentication.

Third Example Embodiment

Next, a third example embodiment will be described in detail with reference to the drawings.

In the third example embodiment, a case where the authentication terminal 30 acquires availability of personal information provision will be described.

Since the configuration of the authentication system according to the third example embodiment can be the same as those of the first and second example embodiments, the description corresponding to FIG. 2 is omitted. Since the processing configurations of the authentication server 10, the management server 20, the authentication terminal 30, and the terminal 50 according to the third example embodiment can be the same as those of the first and second example embodiments, the description thereof will be omitted.

In the third example embodiment, the contact address of the user required in the first and second example embodiments is unnecessary. In the third example embodiment, this is because the authentication terminal 30 acquires availability of personal information provision.

Figure 26:
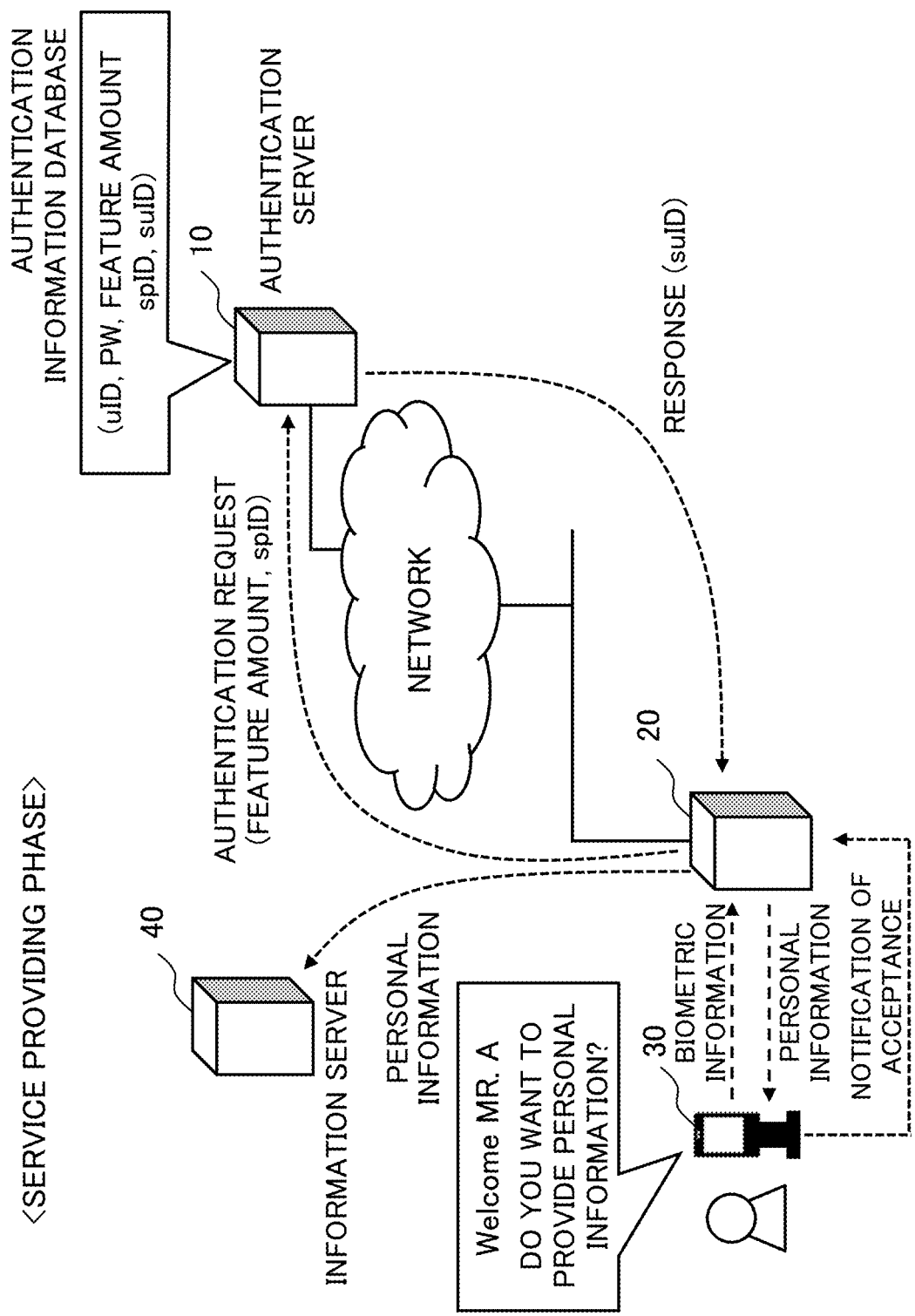
FIG. 26 is a diagram for explaining an operation of an authentication system in a service providing phase according to a third example embodiment.

FIG. 26 is a diagram for explaining an operation of the authentication system in the service providing phase according to the third example embodiment.

As illustrated in FIG. 26, when acquiring the personal information from the management server 20, the authentication terminal 30 provides a service using the personal information. When the provision of the service is finished, the authentication terminal 30 displays a GUI asking whether to provide the personal information.

When the user agrees to provide the personal information, the authentication terminal 30 transmits the notification of acceptance that indicates the agreement to the management server 20. The management server 20 transmits the personal information transmitted to the authentication terminal 30 to the information server 40.

As described above, in the authentication system according to the third example embodiment, the authentication terminal 30 acquires the intention of the user regarding personal information provision. According to the third example embodiment, the user can appropriately control and manage the personal information related to the service by the biometric authentication.

Figure 27:
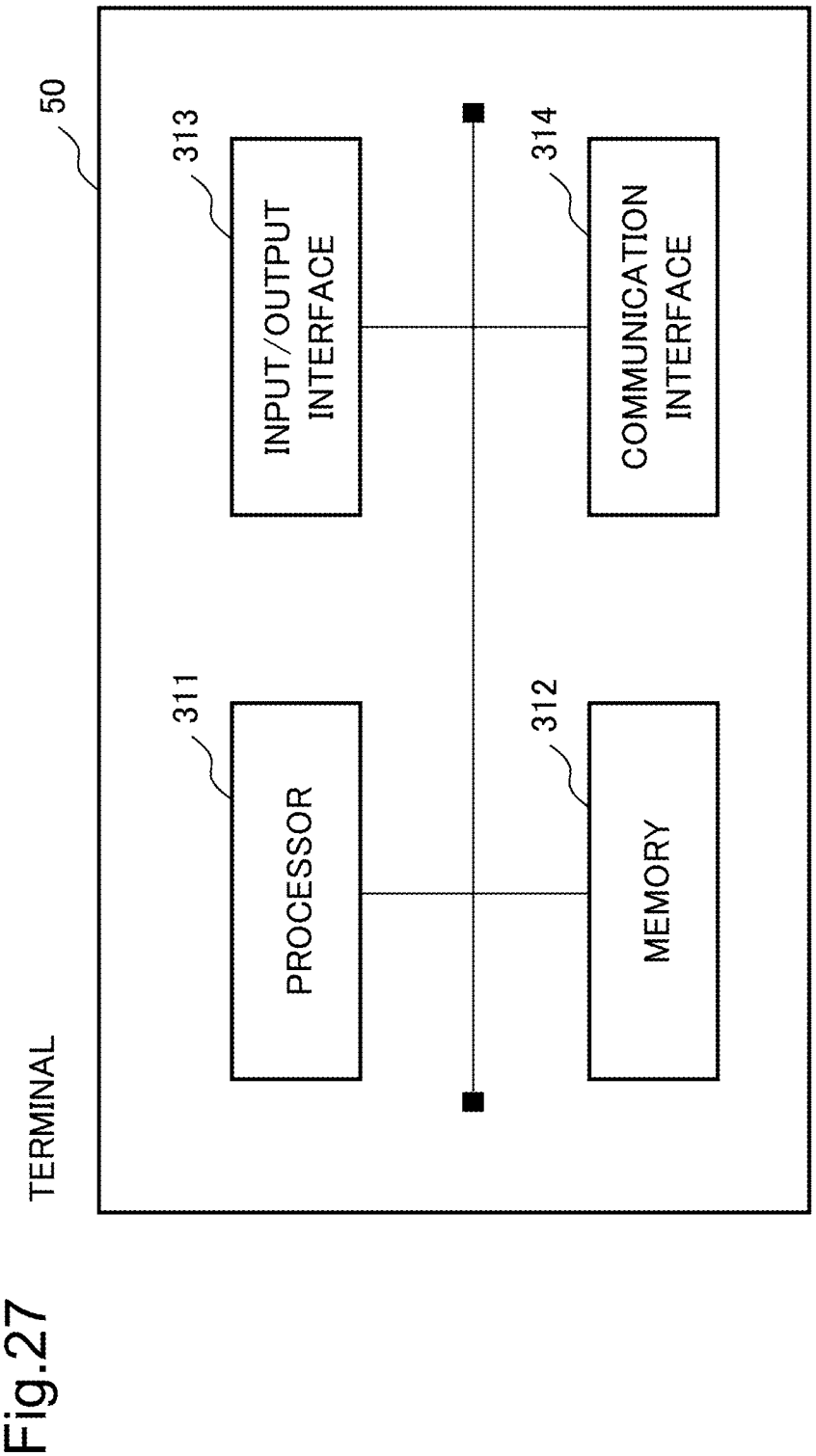
FIG. 27 is a diagram illustrating an example of a hardware configuration of a terminal.

Next, hardware of each device constituting the authentication system will be described. FIG. 27 is a diagram illustrating an example of a hardware configuration of the terminal 50.

The terminal 50 can be configured by an information processing apparatus (so-called computer), and has the configuration illustrated in FIG. 27. For example, the terminal 50 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 27 is not intended to limit the hardware configuration of the terminal 50. The terminal 50 may include hardware (not illustrated). The number of processors 311 and the like included in the terminal 50 is not limited to the example of FIG. 27, and for example, a plurality of processors 311 may be included in the terminal 50.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute various program including an operating system (OS).

The memory 312 is a random access memory (RAM), a read only memory (ROM), a hard disk drive (HDD), a solid state drive (SSD), or the like. The memory 312 stores an OS program, an application program, and various data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a wireless communication circuit, a network interface card (NIC), and the like.

The function of the terminal 50 is achieved by various processing modules. The processing module is achieved, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present invention can also be embodied as a computer program product. The program can be downloaded via a network or updated using a storage medium storing the program. Further, the processing module may be achieved by a semiconductor chip.

The authentication server 10, the management server 20, the authentication terminal 30, the information server 40, and the like can also be configured by the information processing apparatus similarly to the terminal 50, and the basic hardware configuration thereof is not different from that of the terminal 50, and thus description thereof is omitted. For example, the authentication terminal 30 may include a camera for imaging the user.

The terminal 50 is equipped with a computer, and the function of the terminal 50 can be achieved by causing the computer to execute a program. The terminal 50 executes the control method of the terminal 50 by the program.

Modification

The configuration, operation, and the like of the authentication system described in the above example embodiment are merely examples, and are not intended to limit the configuration and the like of the system.

In the above example embodiment, it has been described that the user determines the user ID and the password, and specifies the user (system user) registered in the system using the user ID and the password. However, the authentication system may determine an ID (identifier) that uniquely identifies the system user. For example, in the user registration phase, the authentication server 10 acquires biometric information (face image, feature amount) of the user. The authentication server 10 may generate the ID on the basis of the biometric information. For example, the authentication server 10 may calculate a hash value from the feature amount of the face image and use the calculated hash value instead of the user ID and the password. The feature amount of the face image is different for each user, and the hash value generated from the feature amount is also different for each user, and thus, can be used as the ID of the system user.

In the above example embodiment, it has been described that the user registration phase and the service registration phase are executed at different timings, but these phases may be executed at substantially the same timing. For example, the authentication terminal 30 installed in a service provider to which the user desires to provide a service may be used, and the above two registration phases may be executed. Specifically, the user may perform user registration using the authentication terminal 30, and then continuously perform service registration. In this case, the authentication terminal 30 may include a user registration function (user registration unit 202) of the authentication server 10 and a personal information acquisition function (personal information acquisition unit 302) of the management server 20.

The plurality of authentication terminals 30 possessed by the service provider may not be installed on the same site, building, or the like. If the service providers are common, the authentication terminals 30 may be installed at spatially separated places.

In the above example embodiment, it has been described that one service provider ID is assigned to one service provider, but one service provider ID may be assigned to a plurality of service providers. A plurality of service providers may be grouped as groups, and a service provider ID may be issued for each group. For example, in a case where the service providers S1 and S2 cooperate to provide the same service, a common service provider ID may be issued to the service providers S1 and S2.

In the above example embodiment, the case where the biometric information related to "the feature amount generated from the face image" is transmitted from the management server 20 to the authentication server 10 has been described. However, the biometric information related to the "face image" may be transmitted from the management server 20 to the authentication server 10. In this case, the authentication server 10 may generate a feature amount from the acquired face image and execute authentication processing (collation processing).

In the above example embodiment, the case where the authentication terminal 30 acquires the face image and the management server 20 generates the feature amount from the face image has been described. However, the authentication terminal 30 may generate a feature amount from the face image and transmit the generated feature amount to the management server 20. That is, the management server 20 may not generate the feature amount.

In the above example embodiment, the case where the user inputs the user ID and the password to the service provider when registering the personal information in the service registration phase has been described (see FIG. 14). However, instead of the user ID and the password, the biometric information (face image) of the user may be input to the service provider. In this case, the management server 20 transmits a service registration request including the feature amount generated from the face image and the service provider ID to the authentication server 10. The authentication server 10 executes collation processing using the feature amount included in the request and the feature amount registered in the authentication information database, and specifies the relevant user. When the user is successfully identified (authenticated), the authentication server 10 dispenses the service user ID. With such a response, even when the user forgets the user ID and the password, the user can easily register the service. Alternatively, the service provider may acquire biometric information (face image) of the user in addition to the user ID and the password. In this case, when the user ID, the password, and the biometric information match, the authentication server 10 may dispense the service user ID (two-factor authentication using the biometric information and the password may be executed).

The service provider may cache (temporarily hold) the information acquired from the authentication server 10 and the information acquired from the authentication terminal 30. For example, the management server 20 caches the biometric information acquired from the authentication terminal 30 and the authentication result (service user ID)

based on the biometric information for a predetermined period. When the biometric information is acquired from the authentication terminal 30, the management server 20 confirms the first cached data, and if there is cache data that hits the acquired biometric information, the management server 20 does not transmit the authentication request to the authentication server 10. The management server 20 specifies the personal information using the service user ID included in the cache data. Alternatively, the management server 20 may cache a combination of the biometric information and the personal information. Alternatively, the condition for deleting the cached data may be changed according to the type of service. For example, in a case where an accommodation service is provided by a hotel business operator, the management server 20 may delete the cache data at the timing when the stay period of the guest ends.

A form of data transmission and reception between the devices (authentication server 10, management server 20, and authentication terminal 30) is not particularly limited, but data transmitted and received between the devices may be encrypted. It is desirable that biometric information is transmitted and received between these devices, and encrypted data is transmitted and received in order to appropriately protect the biometric information.

In the above example embodiment, when the user does not agree to provide the personal information, the terminal 50 does not perform a special operation. However, in such a case, the terminal 50 may transmit, to the management server 20, a "notification of rejection" indicating that the user refuses to provide the personal information.

In the above example embodiment, one information center has been exemplified as a destination of the personal information. However, personal information may be provided to a plurality of information centers (information banks). In this case, the user may select the information center permitted to provide the personal information among the plurality of information centers by using the terminal 50. Alternatively, the user may determine whether to provide the personal information for each of the plurality of information centers. Alternatively, the terminal 50 may display the information center together with a benefit obtained by providing the personal information to each information center.

In the above example embodiment, it has been described that the user determines whether to provide personal information for each service provider. However, the terminal 50 may prepare a GUI for inputting availability of personal information provision for the entire authentication system.

The authentication server may not transmit a new notification of authentication for a combination of the user and the service provider to which the notification of authentication has already been transmitted. For example, in the example of FIG. 2, in a case where the user permits the service provider S1 to provide the personal information, the notification of authentication may not be transmitted when the user receives the provision of the service from the service provider S1 at another opportunity. That is, the authentication server 10 may not transmit the notification of authentication twice or more for the same service user ID. This is because it is assumed that there is no change in notification of personal information from the same service provider for the same user.

In the above example embodiment, after a service provider provides a service, it is determined whether to provide personal information. However, the availability of the personal information provision may be performed before the service provision. That is, after authentication is performed by the authentication server 10, it may be determined whether to provide personal information at any timing before or after service provision.

In the above example embodiment, the case where the terminal 50 acquires availability regarding personal information provision has been described. The terminal 50 may be used for a purpose different from the purpose. For example, the user may update other information registered in the authentication server 10 using the terminal 50. For example, the user may access the authentication server 10 using the terminal 50 and select a service provider who receives the provision of the service by the biometric authentication. That is, the user may perform service registration via the authentication server 10. At that time, if the number of service providers is large, a service provider whose use frequency is low or a service provider who has not been used recently may be preferentially displayed. Alternatively, the user may apply for withdrawal from the system or service using the terminal 50.

In the flow diagram (flowchart and sequence diagram) used in the above description, a plurality of steps (processes) are described in order, but the execution order of the steps executed in the example embodiment is not limited to the described order. In the example embodiment, for example, the order of the illustrated steps can be changed within a range in which there is no problem in terms of content, such as executing each process in parallel.

The above example embodiments have been described in detail in order to facilitate understanding of the disclosure of the present application, and it is not intended that all the configurations described above are necessary. In a case where a plurality of example embodiments has been described, each example embodiment may be used alone or in combination. For example, a part of the configuration of the example embodiment can be replaced with the configuration of another example embodiment, or the configuration of another example embodiment can be added to the configuration of the example embodiment. Furthermore, it is possible to add, delete, and replace other configurations for a part of the configuration of the example embodiment.

Although the industrial applicability of the present invention is apparent from the above description, the present invention can be suitably applied to an authentication system that authenticates a customer such as a retail store or a hotel business.

Some or all of the above example embodiments may be described as the following Supplementary Notes, but are not limited to the following.

[Supplementary Note 1]

An authentication system including:

an authentication server that stores first biometric information of a user and performs biometric authentication of the user using the first biometric information;

a management server that stores personal information of the user; and a terminal that is possessed by the user, in which when the biometric authentication of the user is successful, the authentication server transmits, to the terminal, a notification of authentication indicating that the biometric authentication of the user is successful, the terminal acquires an intention of the user as to whether to accept provision of the stored personal information to a third party in response to reception of the notification of authentication, and a notification of acceptance is transmitted to the management server when the user accepts to provide the stored personal information to the third party.

[Supplementary Note 2]

The authentication system according to Supplementary Note 1, in which the management server transmits the personal information of the user to the third party in response to reception of the notification of acceptance.

[Supplementary Note 3]

The authentication system according to Supplementary Note 1 or 2, further including:
an authentication terminal that is connected to the management server, acquires second biometric information of the user, and transmits the acquired second biometric information to the management server, in which
the management server transmits an authentication request including the second biometric information to the authentication server, and
the authentication server performs biometric authentication of the user using the first and second biometric information.

[Supplementary Note 4]

The authentication system according to Supplementary Note 3, in which the authentication server transmits the notification of authentication including information regarding a transmission destination of the notification of acceptance to the terminal.

[Supplementary Note 5]

The authentication system according to Supplementary Note 4, in which the authentication server stores a transmission destination of the notification of authentication.

[Supplementary Note 6]

The authentication system according to Supplementary Note 5, in which
the authentication server stores a first ID that uniquely determines a user in a system, a second ID that identifies a service provider in which the management server is installed, a third ID that is uniquely determined by a combination of the user and the service provider, the first biometric information, and the transmission destination of the notification of authentication in association with each other, and
the management server transmits the authentication request including the first ID and the second ID to the authentication server to acquire the third ID, and stores the acquired third ID and personal information of the user in association with each other.

[Supplementary Note 7]

The authentication system according to Supplementary Note 6, in which
the authentication server transmits the notification of authentication including the third ID and a transmission destination of the notification of authentication to the terminal, and
the terminal transmits the notification of acceptance including the third ID to the management server.

[Supplementary Note 8]

The authentication system according to any one of Supplementary Notes 3 to 7, in which the first and second biometric information are biometric information on a face.

[Supplementary Note 9]

The authentication system according to any one of Supplementary Notes 1 to 8, in which the terminal acquires an intention of the user regarding whether the user agrees to provide the stored personal information to the third party using a graphical user interface (GUI).

[Supplementary Note 10]

An authentication system including:
an authentication server that stores first biometric information of a user and performs biometric authentication of the user using the first biometric information;
a management server that stores personal information of the user; and
a terminal that is possessed by the user, in which
when the authentication server succeeds in the biometric authentication of the user, the management server transmits, to the terminal, a notification of authentication indicating that the biometric authentication of the user is successful,
the terminal acquires an intention of the user as to whether to accept provision of the stored personal information to a third party in response to reception of the notification of authentication, and
a notification of acceptance is transmitted to the management server when the user accepts to provide the stored personal information to the third party.

[Supplementary Note 11]

A terminal that is configured to execute:
receiving, from an authentication server that stores first biometric information of a user and performs biometric authentication of the user by using the first biometric information, a notification of authentication indicating that the biometric authentication of the user is successful;
in response to reception of the notification of authentication, acquiring an intention of the user regarding whether to accept that a management server that stores personal information of the user provides the stored personal information to a third party; and
transmitting a notification of acceptance to the management server when the user accepts to provide the stored personal information to the third party.

[Supplementary Note 12]

A control method of a terminal, including:
by the terminal,
receiving, from an authentication server that stores first biometric information of a user and performs biometric authentication of the user by using the first biometric information, a notification of authentication indicating that the biometric authentication of the user is successful;
in response to reception of the notification of authentication, acquiring an intention of the user regarding whether to accept that a management server that stores personal information of the user provides the stored personal information to a third party; and
transmitting a notification of acceptance to the management server when the user accepts to provide the stored personal information to the third party.

[Supplementary Note 13]

A computer-readable storage medium storing a program for causing a computer mounted in a terminal to execute:
receiving, from an authentication server that stores first biometric information of a user and performs biometric authentication of the user by using the first biometric information, a notification of authentication indicating that the biometric authentication of the user is successful;
in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

The disclosures of the cited prior art documents are incorporated herein by reference. Although the example embodiments of the present invention have been described above, the present invention is not limited to these example embodiments. It will be understood by those of ordinary skill in the art that these example embodiments are exemplary only and that various variations are possible without departing from the scope and spirit of the present invention. That is, it goes without saying that the present invention includes various modifications and corrections that can be made by those of ordinary skill in the art in accordance with the entire disclosure including the claims and the technical idea.

REFERENCE SIGNS LIST 10, 101 authentication server
20, 20-1, 20-2, 102 management server
30, 30-1, 30-2, 31-1, 31-2 authentication terminal
40 information server
50, 103 terminal
201, 301, 401, 501 communication control unit
202 user registration unit
203, 304 database (DB) management unit
204 service registration unit
205 authentication unit
206, 307, 405, 503 storage unit
302 personal information acquisition unit
303 service registration request unit
305 authentication request unit
306 personal information providing unit
311 processor
312 memory
313 input/output interface
314 communication interface
402 biometric information acquisition unit
403 service providing unit
404 message output unit
502 personal information control unit

What is claimed is:

1. An authentication system comprising:
an authentication server that stores first biometric information of a user and performs biometric authentication of the user using the first biometric information;
a management server that stores personal information of the user; and
a terminal that is possessed by the user, wherein
when the biometric authentication of the user is successful, the authentication server transmits, to the terminal, a notification of authentication indicating that the biometric authentication of the user is successful,
the terminal acquires an intention of the user as to whether to accept provision of the stored personal information to a third party in response to reception of the notification of authentication, and
a notification of acceptance is transmitted to the management server when the user accepts to provide the stored personal information to the third party.

2. The authentication system according to claim 1, wherein the management server transmits the personal information of the user to the third party in response to reception of the notification of acceptance.

3. The authentication system according to claim 1, further comprising:

an authentication terminal that is connected to the management server, acquires second biometric information of the user, and transmits the acquired second biometric information to the management server, wherein
the management server transmits an authentication request including the second biometric information to the authentication server, and
the authentication server performs biometric authentication of the user using the first and second biometric information.

4. The authentication system according to claim 3, wherein the authentication server transmits the notification of authentication including information regarding a transmission destination of the notification of acceptance to the terminal.

5. The authentication system according to claim 4, wherein the authentication server stores a transmission destination of the notification of authentication.

6. The authentication system according to claim 5, wherein
the authentication server stores a first ID that uniquely determines a user in a system, a second ID that identifies a service provider in which the management server is installed, a third ID that is uniquely determined by a combination of the user and the service provider, the first biometric information, and the transmission destination of the notification of authentication in association with each other, and
the management server transmits the authentication request including the first ID and the second ID to the authentication server to acquire the third ID, and stores the acquired third ID and personal information of the user in association with each other.

7. The authentication system according to claim 6, wherein
the authentication server transmits the notification of authentication including the third ID and a transmission destination of the notification of authentication to the terminal, and
the terminal transmits the notification of acceptance including the third ID to the management server.

8. The authentication system according to claim 3, wherein the first and second biometric information are biometric information on a face.

9. The authentication system according to claim 1, wherein the terminal acquires an intention of the user regarding whether the user agrees to provide the stored personal information to the third party using a graphical user interface (GUI).

10. A terminal comprising:
at least one processor configured to execute:
receiving, from an authentication server that stores first biometric information of a user and performs biometric authentication of the user by using the first biometric information, a notification of authentication indicating that the biometric authentication of the user is successful;
in response to reception of the notification of authentication, acquiring an intention of the user regarding whether to accept that a management server that stores personal information of the user provides the stored personal information to a third party; and
transmitting a notification of acceptance to the management server when the user accepts to provide the stored personal information to the third party.

11. A control method of a terminal, comprising:

by the terminal, receiving, from an authentication server that stores first biometric information of a user and performs biometric authentication of the user by using the first biometric information, a notification of authentication indicating that the biometric authentication of the user is successful;

in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

12. A non-transitory computer-readable storage medium storing a program for causing a computer mounted in a terminal to execute:

receiving, from an authentication server that stores first biometric information of a user and performs biometric authentication of the user by using the first biometric information, a notification of authentication indicating that the biometric authentication of the user is successful;

in response to reception of the notification of authentication, acquiring an intention of the user regarding whether to accept that a management server that stores personal information of the user provides the stored personal information to a third party; and transmitting a notification of acceptance to the management server when the user accepts to provide the stored personal information to the third party.

* * * * *